United States Patent
Choi et al.

(10) Patent No.: US 12,133,192 B2
(45) Date of Patent: Oct. 29, 2024

(54) SIDELINK POSITIONING: SWITCHING BETWEEN ROUND-TRIP-TIME AND SINGLE-TRIP-TIME POSITIONING

(71) Applicant: QUALCOMM Incorporated, San Diego, CA (US)

(72) Inventors: Chang-Sik Choi, Seoul (KR); Kapil Gulati, Belle Mead, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 17/205,907

(22) Filed: Mar. 18, 2021

(65) Prior Publication Data

US 2021/0306979 A1 Sep. 30, 2021

Related U.S. Application Data

(60) Provisional application No. 62/994,474, filed on Mar. 25, 2020.

(51) Int. Cl.
*H04W 64/00* (2009.01)
*H04L 5/00* (2006.01)
(Continued)

(52) U.S. Cl.
CPC ......... *H04W 64/006* (2013.01); *H04L 5/0051* (2013.01); *H04W 56/009* (2013.01); *H04W 80/02* (2013.01); *H04W 92/18* (2013.01)

(58) Field of Classification Search
None
See application file for complete search history.

(56) References Cited

U.S. PATENT DOCUMENTS 10,616,869 B2   4/2020   Chen et al.
2010/0135178 A1   6/2010   Aggarwal et al.
(Continued)

FOREIGN PATENT DOCUMENTS

WO   2010059934 A2   5/2010
WO   2017139097      8/2017
(Continued)

OTHER PUBLICATIONS

International Search Report and Written Opinion—PCT/US2021/023109—ISA/EPO—Jun. 4, 2021.
(Continued)

*Primary Examiner* — Yemane Mesfin
*Assistant Examiner* — Jeff Banthrongsack
(74) *Attorney, Agent, or Firm* — QUALCOMM Incorporated

(57) ABSTRACT

Systems, methods, and devices for sidelink positioning determination and communication can employ techniques including obtaining, at a first sidelink-enabled device, data from one or more data sources indicative of one or more criteria for using either round-trip time (RTT)-based positioning of a target node or single-sided (SS)-based positioning of the target node. The techniques also include selecting, with the first sidelink-enabled device, a positioning type from the group may comprise of RTT-based positioning and SS-based positioning, based on the data. The techniques also include sending a message from the first sidelink-enabled device to a second sidelink-enabled device, where the message includes information indicative of the selected positioning type.

28 Claims, 9 Drawing Sheets

(51) Int. Cl.
    *H04W 56/00*     (2009.01)
    *H04W 80/02*     (2009.01)
    *H04W 92/18*     (2009.01)

(56) References Cited

U.S. PATENT DOCUMENTS

| | | |
|---|---|---|
| 2013/0109413 A1 | 5/2013 | Das et al. |
| 2016/0095092 A1* | 3/2016 | Khoryaev ............ G01S 5/0289 |
| | | 370/329 |
| 2018/0049014 A1* | 2/2018 | Patil ...................... H04W 16/14 |
| 2018/0132061 A1 | 5/2018 | Bitra et al. |
| 2019/0386926 A1* | 12/2019 | Abedini ................ H04L 47/283 |

FOREIGN PATENT DOCUMENTS

| | | | |
|---|---|---|---|
| WO | WO 2017196510 | 11/2017 | |
| WO | WO-2017196510 A1 * | 11/2017 | ............. G01S 19/09 |
| WO | WO-2018068817 A1 * | 4/2018 | ............. H04W 4/02 |
| WO | 2018113947 A1 | 6/2018 | |
| WO | WO 2018106467 | 6/2018 | |
| WO | WO-2018106467 A1 * | 6/2018 | |

OTHER PUBLICATIONS

Dan X., et al., "Navigation and Location Using Synchronization Mechanism in Link 16", Computer Engineering and Design, vol. 27 No. 12, Jun. 28, 2006, 3 Pages.

\* cited by examiner

SIDELINK POSITIONING: SWITCHING BETWEEN ROUND-TRIP-TIME AND SINGLE-TRIP-TIME POSITIONING

RELATED APPLICATIONS

This application claims the benefit of U.S. Provisional Application No. 62/994,474, filed Mar. 25, 2020, entitled "SIDELINK POSITIONING: SWITCHING BETWEEN ROUND-TRIP-TIME AND SINGLE-TRIP-TIME POSITIONING", which is assigned to the assignee hereof, and incorporated herein in its entirety by reference.

BACKGROUND

Sidelink is an adaptation of cellular standards (e.g., Long-Term Evolution (LTE) and 5th-Generation (5G) New Radio (NR) standards, developed by and defined by the third Generation Partnership Project (3GPP)) that allows direct communication between two cellular devices, rather than conveying information between the two cellular devices via intervening cellular infrastructure (e.g., a cellular base station). Among other things, sidelink functionality can be used for vehicle to everything (V2X)-capable communications. V2X that uses cellular technology may be referred to as cellular V2X (CV2X).

V2X communication, enabled by sidelink, can convey information from a vehicle capable of communicating via V2X (or "V2X-capable vehicle") to other V2X-capable vehicles, infrastructure (e.g., Road-Side Units (RSUs)), pedestrians, etc., to help to enhance the safety and efficiency of autonomous and semi-autonomous V2X-capable vehicles. For example, path and maneuver planning for V2X-capable vehicle depends on knowing the accurate distances and relative locations. The capabilities and behavior of surrounding vehicles helps determine, for example, safe inter-vehicle spacing and lane change maneuvering. The location and location-related measurements are regularly communicated between V2X-capable, for example, through Intelligent Transport System (ITS) messages.

BRIEF SUMMARY

Techniques described herein enable the source node and/or target node to identify "switching" criteria to consider when deciding whether to switch between Round-Trip Time (RTT)-based and Single-Sided (SS)-based positioning. Further, this decision may be made by the source node using existing message formats, such as ITS. In some embodiments, this indication may be included in pre-PRS messages.

An example method of sidelink positioning determination and communication, according to this disclosure, comprises obtaining, at a first sidelink-enabled device, data from one or more data sources indicative of one or more criteria for using either round-trip time (RTT)-based positioning of a target node or single-sided (SS)-based positioning of the target node. The method also comprises selecting, with the first sidelink-enabled device, a positioning type from the group may comprise of RTT-based positioning and SS-based positioning, based on the data. The method also comprises sending a message from the first sidelink-enabled device to a second sidelink-enabled device, where the message includes information indicative of the selected positioning type.

An example first sidelink-enabled device for sidelink positioning determination and communication, according to this disclosure, comprises a transceiver, a memory, and one or more processing units communicatively coupled with the transceiver and the memory. The one or more processing units are configured to obtain data from one or more data sources indicative of one or more criteria for using either round-trip time (RTT)-based positioning of a target node or single-sided (SS)-based positioning of the target node The one or more processing units are also configured to select a positioning type from the group may comprise of RTT-based positioning and SS-based positioning, based on the data. The one or more processing units are also configured to send a message via the transceiver to a second sidelink-enabled device, where the message includes information indicative of the selected positioning type.

An example device for sidelink positioning determination and communication, according to this disclosure, comprises means for obtaining data from one or more data sources indicative of one or more criteria for using either round-trip time (RTT)-based positioning of a target node or single-sided (SS)-based positioning of the target node. The device also comprises means for selecting a positioning type from the group may comprise of RTT-based positioning and SS-based positioning, based on the data. The device also comprises means for sending a message from the first sidelink-enabled device to a second sidelink-enabled device, where the message includes information indicative of the selected positioning type.

An example non-transitory computer-readable medium, according to this disclosure, stores instructions for sidelink positioning determination and communication. The instructions comprise code for obtaining data from one or more data sources indicative of one or more criteria for using either round-trip time (RTT)-based positioning of a target node or single-sided (SS)-based positioning of the target node. The instructions also comprise code for selecting a positioning type from the group may comprise of RTT-based positioning and SS-based positioning, based on the data. The instructions also comprise code for sending a message from the first sidelink-enabled device to a second sidelink-enabled device, where the message includes information indicative of the selected positioning type.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

The embodiments described herein discuss the use of sidelink positioning with respect to vehicle-related communications, such as V2X. It will be understood, however, that embodiments are not so limited. Embodiments may, for example, utilize the techniques herein for sidelink positioning between two devices that are not vehicles, such as two mobile phones, a mobile phone and an RSU, etc.

Figure 1:
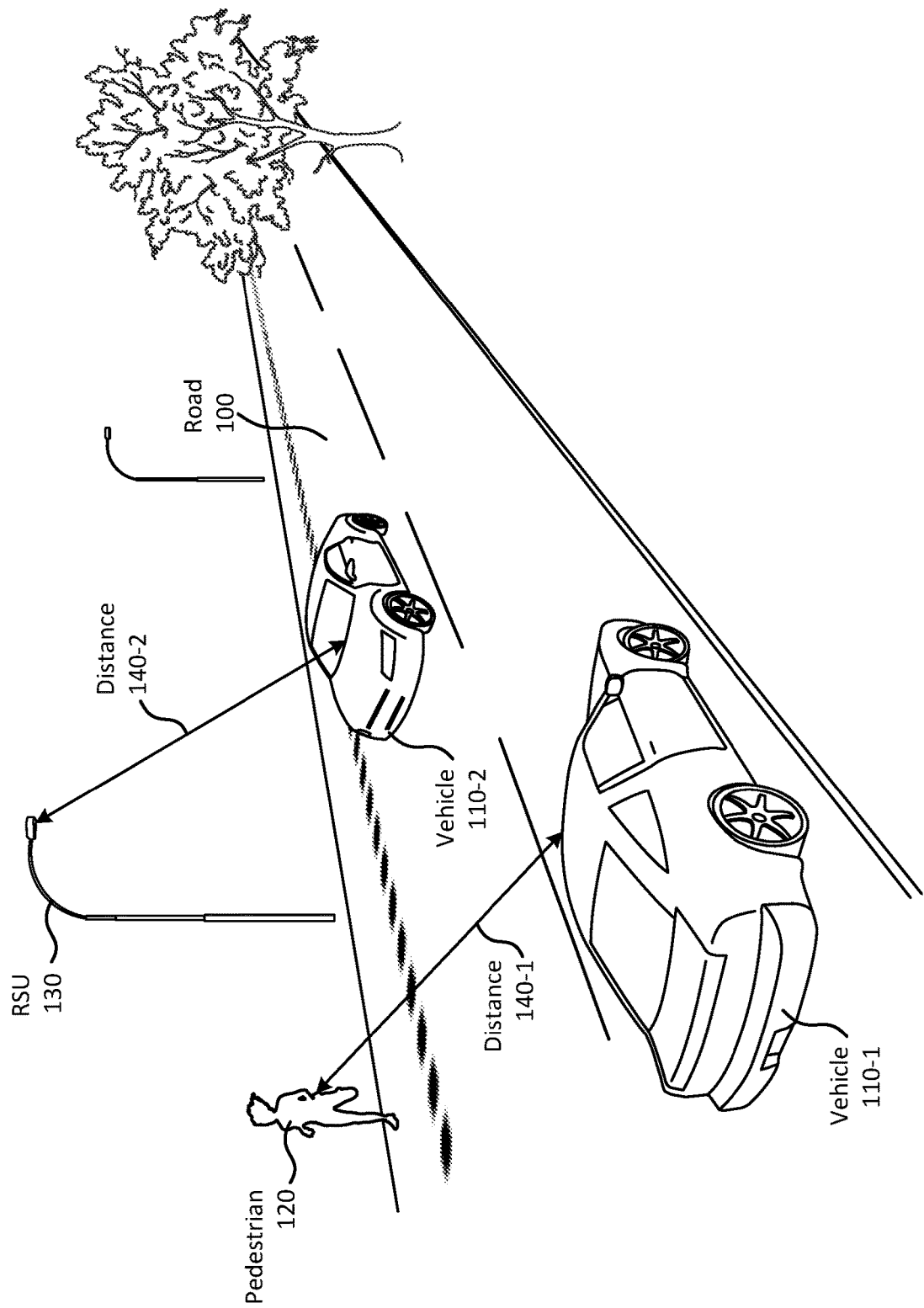
FIG. 1 is a perspective view of a traffic scenario in which sidelink communications can enable V2X communications between various V2X-enabled entities.

FIG. 1 is a perspective view of a traffic scenario in which sidelink communications can enable V2X communications between various V2X-enabled entities. Here, the road 100 is shared by vehicles 110-1 and 110-2 (collectively and generically referred to as vehicles 110), and a pedestrian 120 (or vulnerable road user (VRU)). Additionally, an RSU 130 (in this case, a streetlamp equipped with a V2X-enabled transceiver) is located near the road 100.

Modern vehicles 110 frequently come equipped with highly accurate positioning systems, based on sensors such as an Inertial Measurement Unit (IMU), Global Navigation Satellite System (GNSS) receiver, wireless transceiver, and the like. Among other things, these sensors can allow a vehicle 110 to determine its position accurately in a preferred global frame of reference. Furthermore, vehicles 110 may be further equipped with a multitude of perception sensors (e.g. camera, LIDAR, radar, and so forth). These additional sensors can also be used in conjunction with map information to determine the location of the vehicle 110 (e.g., by comparing the position of an observed object to its position on a map), and/or these additional sensors can be used for situational awareness purposes to identify other vehicles 110, objects, VRUs, and the like.

As an example, a first vehicle 110-1 may be equipped with autonomous or semi-autonomous driving capabilities. To ensure the first vehicle 110-1 stays in its lane on the road 100, the first vehicle 110-1 may utilize information from one or more positioning systems (e.g., based on GNSS, IMU, and/or wireless transceiver positioning). Additionally, the first vehicle 110-1 may use additional information from onboard sensors (cameras, LIDARs, radars, etc.) and V2X communication (e.g., CV2X and potentially other forms of V2X communication) received from others V2X-enabled entities to determine the location of the second vehicle 110-2, pedestrian 120, and the like, relative to the first vehicle 110-1. This additional information can ensure the first vehicle 110-1 safely navigates the road 100 in view of current traffic conditions.

Positioning using V2X (sidelink) communications can be one form of positioning using a wireless transceiver, used by a vehicle 110 and/or other device to determine its location. That is, a distance determination between two V2X-enabled devices can be made using V2X communications to conduct RTT and/or SS measurements. Referring again to FIG. 1, these types of measurements can be made, for example, to measure the distance 140-1 between the first vehicle 110-1 and the pedestrian 120 (where the pedestrian is carrying a V2X-enabled device, such as a mobile phone), and/or the distance 140-2 between the second vehicle 110-2 and the RSU 130. Ultimately, distance determination can be made between any two V2X-enabled devices, and this information can be used, along with other information (e.g., map information, GNSS information, other distance determinations, etc.) to help estimate an accurate position of one or both of the V2X-enabled devices.

Figure 3:
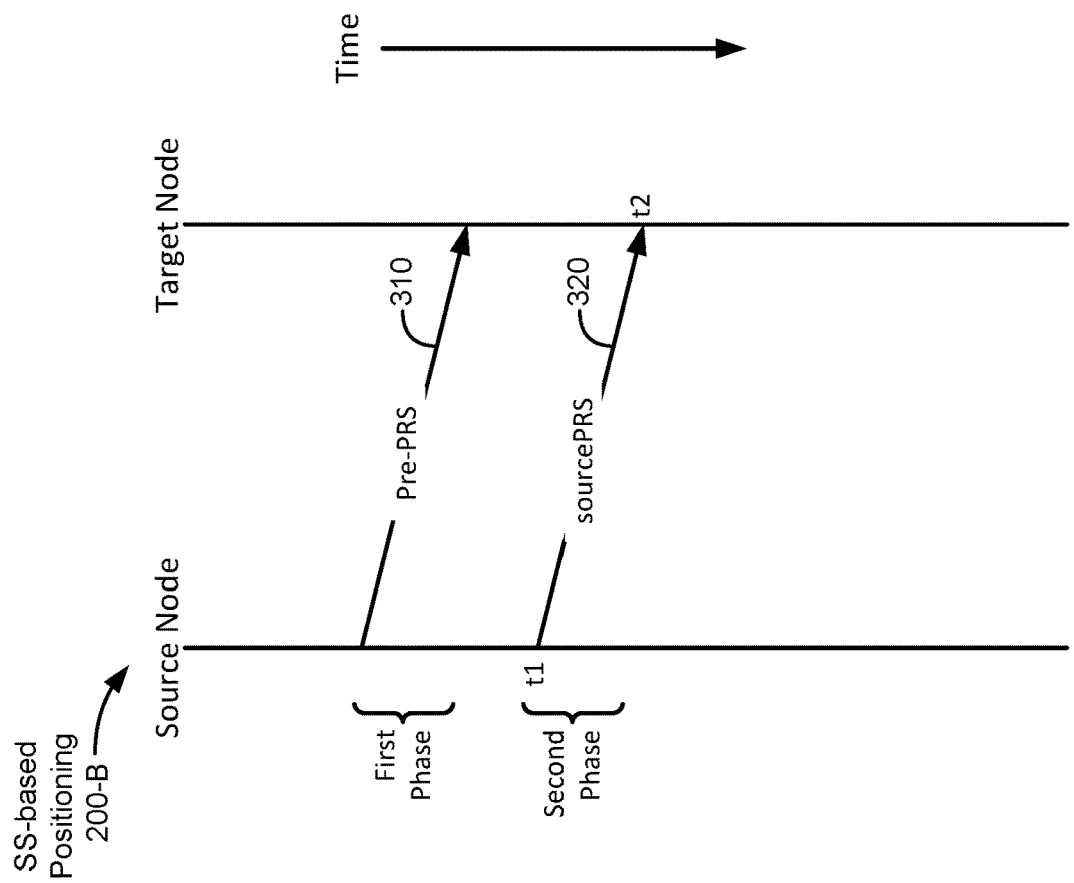
FIGS. 2 and 3 are timing diagrams of messages exchanged during RTT-based positioning and SS-based positioning, respectively.
Figure 2:
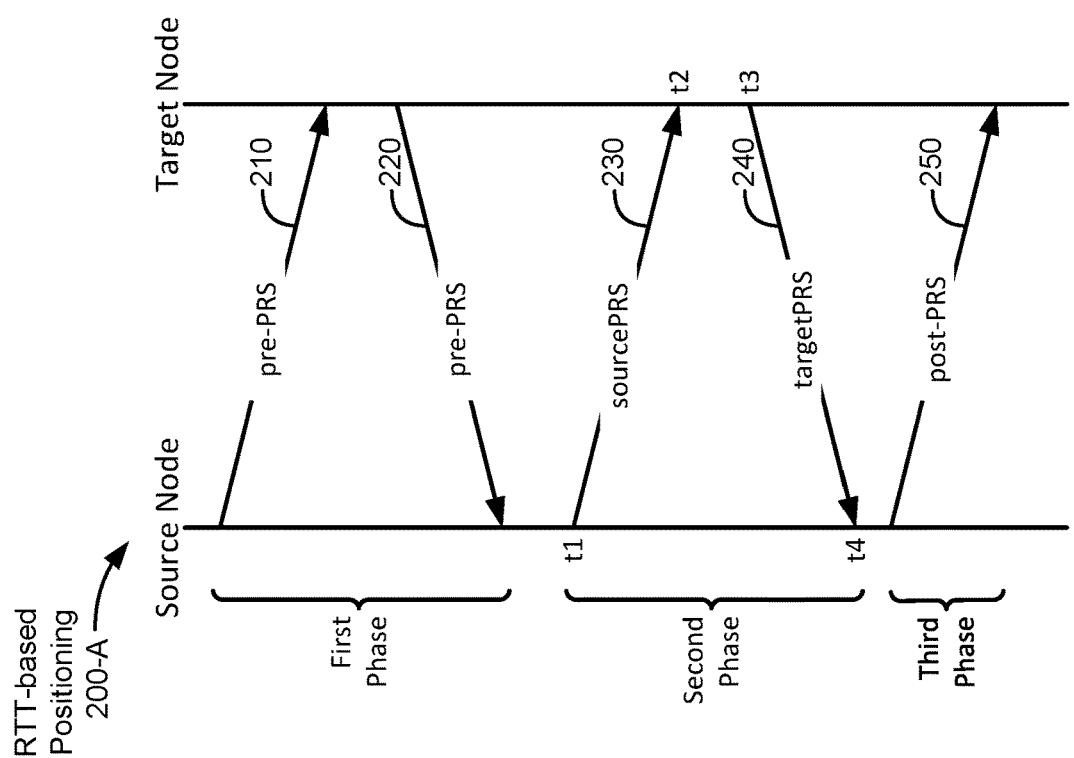

FIGS. 2 and 3 are timing diagrams of messages exchanged during RTT-based positioning 200-A and SS-based positioning 200-B, respectively. (For simplicity, these terms are also referred to herein simply as "RTT positioning" and "SS positioning," respectively.) Here, the "source node" is referred to as the V2X-enabled device initiating the RTT-based or SS-based positioning, which is typically the node having a known position. Additionally, the "target node" is typically the V2X-enabled device with an unknown position. Referring again to FIG. 1, a distance determination for distance 140-2 may be made to determine the position of the second vehicle 110-2, based on a known location of RSU 130. Thus, the RSU 130 may be the source node and the vehicle 110-2 may be the target node.

On the other hand, a distance determination for distance 140-1 may be made to determine the position of pedestrian 120, based on a known location of the first vehicle 110-1. In this case, the first vehicle 110-1 may be the source node and the pedestrian 120 (or, more specifically, the V2X-enabled mobile device carried by the pedestrian 120) may be the target node.

Returning again to FIG. 2, RTT-based positioning 200-A generally proceeds in three phases, defined with respect to the transmission of a Position Reference Signal (PRS) by the source node. The first phase of RTT-based positioning 200-A comprises the sending of "pre-PRS" messages in preparation for the subsequent transmission of the PRS signals. A first pre-PRS message 210 is transmitted from the source node and received by the target node. This can convey information about the PRS message (e.g., a PRS ID, resource ID, or the like) from the source node to the target node. A second pre-PRS message 220, sent from the target node to the source node, may comprise an acknowledgment of receipt of the pre-PRS message 210 by the target node. Pre-PRS messages 210 and 220 may be sent via radiofrequency (RF) spectrum licensed for ITS communications.

The second phase of RTT-based positioning 200-A comprises the sending of PRS signals, which are used as timing signals to determine the time-of-flight (between transmission and reception) and, ultimately, distance between the source node and target node. Specifically, the source node sends a message comprising a source PRS 230 at time t1, which is received by the target node at time t2. The target node then responds by sending a message comprising a target PRS 240 at time t3, which is then received by the source node at time t4. RTT can then be calculated from the difference between t4 and t1 minus the difference between t3 and t2. From RTT, time-of-flight (TOF) can then be calculated (RTT/2), as well as distance (TOF*C). PRS 230 and 240 may be sent via licensed or unlicensed RF spectrum.

The third phase of RTT-based positioning 200-A comprises the source node sending a "post-PRS" message 250 to the target node. The post-PRS message 250 may comprise measurement information derived from PRS signals 230 and 240, for use by the target node. That is, using the post-PRS message 250, the source node can provide the target node with information the target node can use to determine its distance (e.g., by calculating RTT and/or TOF) from the source node, and/or other information for position determination (e.g., the location of the target node). This information can then be used, for example, by Kalman filter of a positioning engine of the target node to accurately estimate clock calibration and ultimately the position of the target node. Similar to the signals of the first phase of RTT-based positioning 200-A, the post-PRS message 250 may be communicated using RF spectrum licensed for ITS communications. In some embodiments, a post-PRS message may be sent from target node to source node (e.g., for instances in which the source node computes the RTT).

With regard to the SS-based positioning 200-B of FIG. 3, the process involves a much simpler two-phase exchange of messages between the source node and the target node. Here, the first phase comprises a pre-PRS message 310 from the source node to the target node. Similar to the pre-PRS message 210 of the RTT-based positioning 200-A, this pre-PRS message 310 may comprise information regarding the timing and content of the source PRS 320, which is sent by the source node in the second phase. In SS-based positioning 200-B, however, no acknowledgment from the target node may be sent.

It can be noted that there may be variations to the SS-based positioning 200-B shown in FIG. 3. For example, the first phase may not necessarily come before the second phase. That is, the source node may send the source PRS 320 prior to sending a message comprising the information (e.g., timing, content) provided in the pre-PRS message 310. Additionally or alternatively, the pre-PRS message 310 (or equivalent) may be sent via an RF spectrum licensed for ITS communications, and/or the source PRS 320 may be sent via unlicensed spectrum. Other alternative embodiments may include other variations.

Because the SS-based positioning 200-B conveys less information, a position estimate of the target node using SS-based positioning 200-B may be less accurate than a position estimate using RTT-based positioning 200-A. Specifically, the Kalman filter of the positioning engine of the target node has to estimate more variables (e.g. location, clock bias, and clock drift) in the case of SS-based positioning 200-B, and may therefore be subject to a larger positioning error. That said, because of its lower overhead, the use of SS-based positioning 200-B can have advantages over RTT-based positioning 200-A in cases where it is desirable to have lower power usage at the target node and/or there is insufficient available bandwidth for RTT-based positioning 200-A. (Additionally or alternatively, because SS-based positioning 200-B has lower signaling overhead, it may be capable of allowing for additional PRS signaling and/or more frequent positioning of the target node with the same amount of bandwidth it would take for RTT-based positioning.)

Embodiments provided herein can address these and other issues by enabling the source node and/or target node to identify "switching" criteria to consider when deciding whether to switch from SS-based positioning to RTT-based positioning or vice versa. Further, this decision may be made by the source node existing ITS message formats. In some embodiments, this indication may be included in pre-PRS messages (e.g., 210 and 310 of FIGS. 2 and 3, respectively). Additional details are provided hereinbelow, with respect to the appended figures.

Figure 4:
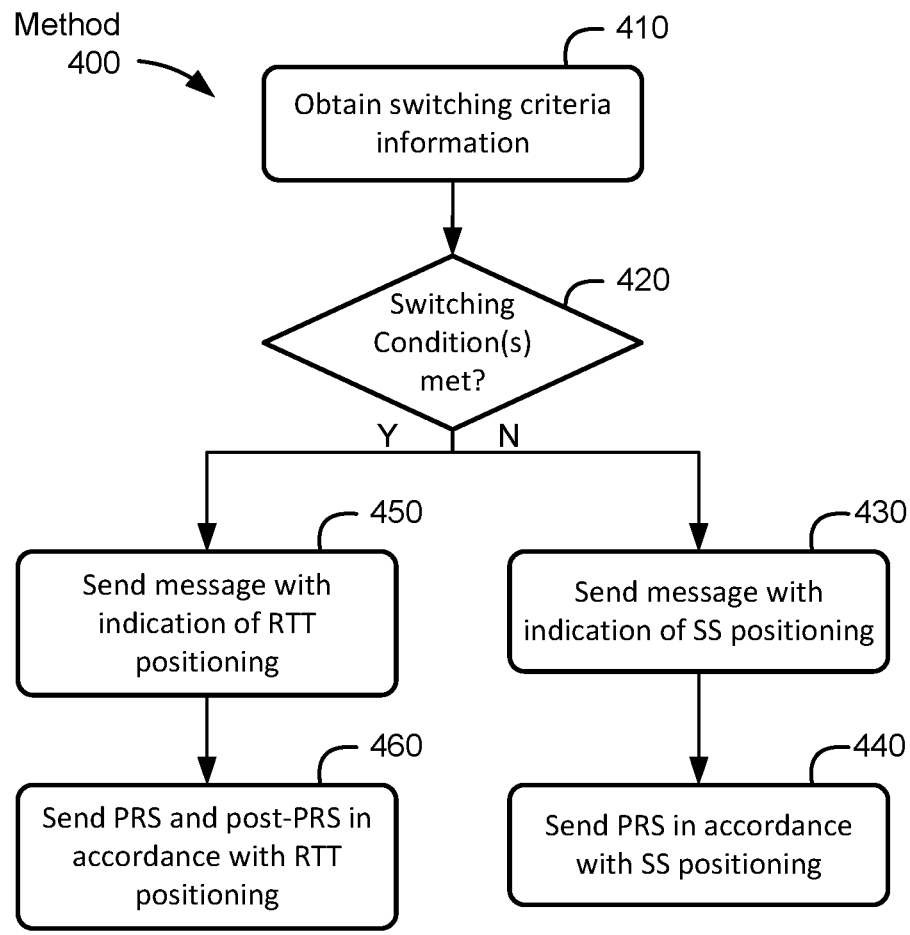
FIG. 4 is a flowchart of a method of obtaining positioning measurements of a target node, according to an embodiment.

FIG. 4 is a flowchart of a method 400 of obtaining positioning measurements of a target node, according to an embodiment. The functionality shown in each of the blocks shown in FIG. 4 may be performed by a source node. As noted above, a source node may comprise a V2X-enabled or other sidelink-enabled device capable of communicating directly with the target node (via sidelink communications). Means for performing these methods may include one or more hardware and/or software components of a sidelink-enabled device, such as those illustrated in FIG. 9, which is described below.

Figure 5:
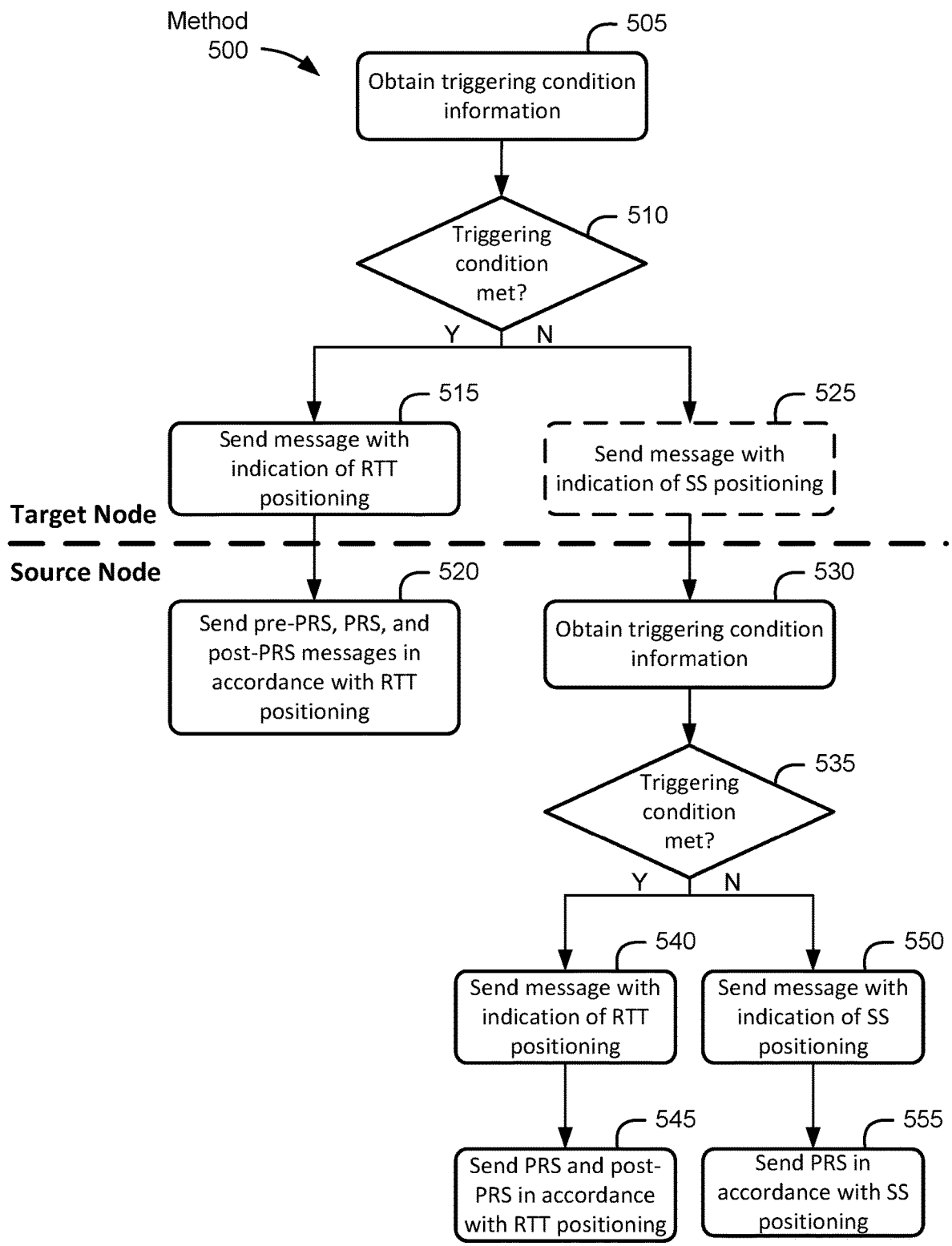
FIG. 5 is a flowchart of a method of obtaining positioning measurements of a target node, according to another embodiment.

It can be noted that the method shown in FIG. 4—and also the method shown in FIG. 5, described hereafter—use SS positioning as a default, switching to RTT positioning when one or more "switching" conditions are met. (This is because, as previously indicated, SS positioning, where possible, can provide advantages in power savings and bandwidth usage.) That said, alternative embodiments may use alternative approaches, such as using RTT positioning as a default and switching to assess positioning when switching conditions are met, weighing different parameters to determine whether to use RTT or SS positioning, and so forth. A person of ordinary skill in the art will recognize such variations may be made to the methods shown in FIGS. 4 and 5.

The functionality at block 410 comprises obtaining switching criteria information. As noted, switching criteria may comprise data indicative of conditions in which it may be preferable to use RTT positioning. Obtaining switching criteria information, therefore, may comprise obtaining data from various data sources to determine whether or not one or more switching conditions are met. These data sources may comprise one or more sensors of source node and/or other devices communicatively coupled with source node. The target node, for example, may comprise a data source of switching criteria.

One such switching criterion may comprise a determination of whether there is a lack of sufficient angular change between source node and target node. That is, multiple distance determinations between the source node and target node over time may result in an angle between the alignment of source and target nodes at a prior time with the alignment of source and target nodes at a subsequent time. This can provide the Kalman filter of the target node within an additional data point with which a current position of the target node may be determined. As previously noted, RTT positioning results in fewer estimations by the Kalman filter than SS positioning. And thus, without this additional data point regarding angular changes, the accuracy of a position determination based on SS positioning may suffer more than the accuracy of a position determination based on RTT positioning. Thus, according to some embodiments, the functionality at block 410 of obtaining switching criteria information may comprise obtaining information regarding whether the relative positions over time between the source node and the target node fail to exhibit a threshold amount of angular changes. This can be determined, for example, based on position information regarding the target node and source node. In some embodiments, the source node may receive position information regarding the target node directly from the target node.

Another switching criterion may comprise a determination of whether a speed sensor of the source node or a target node is inaccurate. In embodiments in which the source node and/or target node comprises a mobile device (e.g., a vehicle 110 or pedestrian 120) a faulty speed sensor can reduce the amount of data points by which the Kalman filter can reliably determine a position estimate for the respective source node or target node. Again, when using fewer data point to determine a position estimate, a Kalman filter may be able to provide a more accurate position estimate using RTT positioning data. Accordingly, according to some embodiments, the functionality at block 410 of obtaining switching criteria information may comprise obtaining information regarding whether a speed sensor of the source node and/or target node is determined to have a variance greater than a threshold value.

A similar switching criterion may comprise a determination of whether the source node or target node is stationary. In such instances, a resulting position determination of the target node may have a higher accuracy when using RTT positioning than when using SS positioning. Accordingly, according to some embodiments, the functionality at block 410 of obtaining switching criteria information may comprise obtaining information regarding whether a source node or target node has moved a threshold amount within a threshold amount of time. Additionally or alternatively, the functionality at block 410 of obtaining switching criteria information may comprise obtaining information regarding whether a relative distance between the source node and target node has not changed a threshold amount within a threshold amount of time.

Another switching criterion may comprise a determination of whether the local oscillator of the source node or target node has been recently synchronized or initialized. In this context, synchronization or initialization of the local oscillator may result in a period of time in which position determination reliant on the local oscillator may be less accurate compared to the ground truth time or universal time. For example, it may be more difficult to estimate local clock bias and clock drift to accurately determine times t1 and t2 for SS positioning (FIG. 3), because each are based on a separate local oscillator. That is, an oscillator time value, T, can be expressed as a function of time as follows: $T=++a+bt$, where a is the bias coefficient, and b is the drift coefficient. These coefficients are device specific, and a can be changed whenever the clock is synchronized or initialized. RTT-based positioning, however, may suffer less inaccuracies because times t1 and t4 are both determined on the local oscillator of the source node, and times t2 and t3 are both determined on the local oscillator or of the target node. Their relative time differences (i.e., t4−t1 and t3−t2), which are used to determine TOF, do not suffer from inaccuracies that may arise if relative frequency and/or phase offsets between respective local oscillators of the source node or target node have not been determined due to recent synchronization or initialization of one or both of the local oscillators. Thus, according to some embodiments, the functionality at block 410 of obtaining switching criteria information may comprise obtaining information regarding whether the respective local oscillator of a source node or target node has been synchronized or initialized within a threshold amount of time before RTT positioning or SS positioning is to take place.

At block 420, the functionality comprises determining whether one or more switching conditions have been met. Giving the switching criteria above, switching conditions may still vary, depending on desired functionality. For example, for each of these switching criteria, respective threshold values may be set or changed to provide certain functionality for the source node and/or target node. These values may be selected, for example, to provide a desired balance of bandwidth usage, power savings, and/or position accuracy. In some embodiments, these values may be selected to optimize one benefit (e.g., position accuracy) at the expense of the others (e.g., power savings and bandwidth usage). In some embodiments, these values may be changed from one mode (e.g. position accuracy optimization) to another (e.g., a balance of benefits), depending on environmental or other factors pertaining to the source node and/or target node. In some embodiments, communications sent to the source node and/or target node may cause this change from one mode to another. In addition to or as an alternative to modifying threshold values, some embodiments may weigh the various switching criteria information differently to emphasize and/or deemphasize different criteria. Again, this may depend on a particular mode of operation or desired functionality.

With this in mind, the functionality shown in block 420 of determining whether one or more switching conditions are met may comprise determining whether respective thresholds of any of the switching criteria have been exceeded. In some embodiments and/or modes of functionality, this may be sufficient to determine that a switching condition has been met. In some embodiments and/or modes of functionality, determining whether switching conditions are met may include combining information from multiple switching criteria to determine whether, on balance, a switching condition has been met. For example, it may be different determined at block 420 that a switching condition is met if, although no single threshold value has been exceeded for given switching criterion, values for multiple criteria are nearing their respective thresholds. Furthermore, as noted, some values may be given more weight than others, depending on desired functionality.

If the switching condition(s) has not been met at block 420, the method 400 can then proceed to block 430, where a message is sent by the source node to the target node, indicating SS positioning is to be performed. As previously noted, this may comprise the pre-PRS message 310 of the first phase of SS-based positioning (FIG. 3), which may comprise an ITS message. The method 400 can then proceed to block 440, where the functionality comprises sending the PRS in accordance with SS positioning (e.g., performing the second phase of SS-based positioning illustrated in FIG. 3).

Alternatively, if the switching condition(s) has been met at block 420, the method 400 can then proceed to block 450, where a message is sent by the source node to the target node, indicating RTT positioning is to be performed. This may comprise the pre-PRS message 210 of the first phase of RTT-based positioning (FIG. 2), which again may comprise an ITS message. The method 400 can then proceed to block 460, where the functionality comprises sending the PRS in accordance with RTT positioning (e.g., performing the second and third phases phase of RTT-based positioning illustrated in FIG. 2).

According to some embodiments, when messages indicate RTT positioning is to be used (e.g., as shown by the functionality of block 450) or SS positioning is to be used (e.g., as shown by the functionality of block 430), they can be sent using existing formats to contain the messages. These formats may comprise, for example, Media Access Control-Control Element (MAC-CE) or second stage control. Additionally or alternatively, one or more additional bits in an existing message format (e.g., an ITS message) can be used to indicate whether SS positioning or RTT positioning is to be used. An example of a two-bit indication in a message sent from the source node to the target node is shown in Table 1.

TABLE 1

Example two-bit indication in a message to target node

| Bits | Instructions to Target Node |
|---|---|
| 00 | Default: PRS will be enabled |
| 01 | RTT: target PRS should be broadcast by the target node |
| 10 | SS: target PRS should not be broadcast by the target node |
| 11 | (Not used) |

Although the above-described embodiments provide for a source node sending an indication of whether to use RTT positioning or SS positioning, embodiments are not so limited. As previously noted, the functionality at block 410 of obtaining switching criteria information performed at the source node may involve receiving information from the target node. Thus, in some embodiments, the target node may perform a method similar to method 400 of FIG. 4 to determine whether to use RTT positioning or SS positioning, and provide an indication to the source node. Moreover, this functionality may be coupled to the functionality of FIG. 4 such that both the target node and the source node may determine whether one or more switching conditions are met. An example of this is shown in FIG. 5.

FIG. 5 is a flowchart of a method 500 of obtaining positioning measurements of a target node, according to another embodiment. Here, the functionality shown in each of the blocks shown in FIG. 5 may be performed by either a target node or a source node, as indicated. Again, the source node and/or target node may comprise a V2X-enabled or other sidelink-enabled device capable of communicating directly with the target node (via sidelink communications). Thus, means for performing these methods may include one or more hardware and/or software components of a sidelink-enabled device, such as those illustrated in FIG. 9, which is described below.

The functionality at blocks 505 and 510 can mirror the functionality of blocks 410 and 420 of FIG. 4, respectively. As such, the functionality and considerations for obtaining the switching criteria information and determining whether one or more switching conditions are met can be the same as previously described with regard to blocks 410 and 420. (That said, because the source node can perform similar functions (as described below with regard to the functionality at block 530 and 535), the target node may not, in some embodiments, receive information from the source node when obtaining switching criteria information. That said, in alternative embodiments, the target node may receive information from the source node.)

If a switching condition is met, then the method 500 can proceed to the functionality shown at block 515, which comprises sending a message with an indication of RTT positioning from the target node to the source node. In some embodiments, this message may comprise an ITS message. In this case, the source node can then conduct RTT positioning in a manner similar to that shown in FIG. 2, by (as illustrated by block 520) sending pre-PRS, PRS, and post PRS messages to the target node (which can also send responsive messages, as shown in FIG. 2, but omitted in FIG. 5).

If the switching condition is not met at block 510, the target node may then perform the optional functionality shown at block 525, involving sending a message with an indication of SS positioning to the source node. (Again, in embodiments, this message may comprise an ITS message.) That is, in some embodiments and/or in some conditions, the target node may send a message indicating that no switching conditions have been met. That said, in other embodiments and/or conditions, the source node may proceed to perform the functionality shown at block 530 without having received a message from the target node at block 525.

The functionality of blocks 530-555 performed by the source node can echo corresponding functions shown in FIG. 4, which are described above. Thus, the method 500 illustrates an embodiment in which both target node and source node may determine whether a switching condition is met. Ultimately, if either node determines a switching condition is met, then RTT positioning is performed. Otherwise, SS positioning is performed.

As previously indicated, although embodiments described herein may have particular application to V2X communications, embodiments are not so limited. That is, embodiments may extend to the positioning of other types of sidelink-enabled devices. An example of an embodiment applicable to all sidelink-enabled devices is provided in FIG. 6. It can be noted that the functionality of FIG. 6 may encompass some or all of the functionality described with regard to FIGS. 4 and/or 5.

Figure 6:
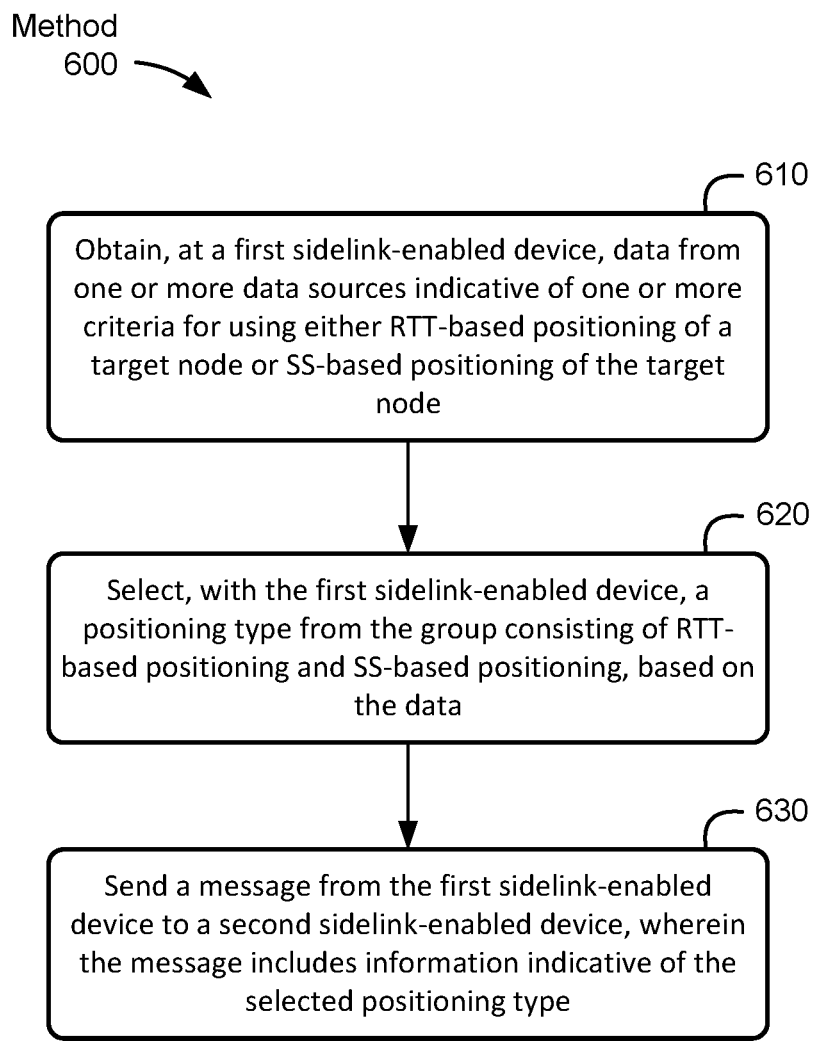
FIG. 6 is a flow diagram of a method of sidelink positioning determination and communication, according to an embodiment.

FIG. 6 is a flow diagram of a method 600 of sidelink positioning determination and communication, according to an embodiment. One or more of the functions of the method 600 may be performed by a sidelink-enabled device (e.g., a target node and/or source node). Moreover, as noted, the functionality of a sidelink-enabled device (e.g., a V2X-enabled device) may be implemented by hardware and/or software components such as those illustrated in FIG. 9 and described below. As such, in some embodiments, means for performing one or more of the functions illustrated in the blocks of FIG. 6 may comprise one or more of the hardware and/or software components illustrated in FIG. 9. Furthermore, alternative embodiments may alter the functionality shown in the blocks of FIG. 6 by separating or combining blocks to perform functions in a different order, simultaneously, etc. A person of ordinary skill in the art will readily recognize such variations in view of the description herein.

The functionality of block 610 comprises obtaining, at a first sidelink-enabled device, data from one or more data sources indicative of one or more criteria for using either RTT-based positioning of a target node or SS-based positioning of the target node. As noted, the one or more criteria may comprise whether relative positions over time between the first sidelink-enabled device and the second sidelink-enabled device fail to exhibit a threshold amount of angular changes: whether a respective speed sensor of the first sidelink-enabled device, the second sidelink-enabled device, or both, is determined to have a variance greater than a threshold value: whether the first sidelink-enabled device, the second sidelink-enabled device, or both, has moved a first threshold distance within a threshold amount of time: whether a relative distance between the first sidelink-enabled device and the second sidelink-enabled device has not changed a second threshold distance within a threshold amount of time, or whether the respective local oscillator of the first sidelink-enabled device, the second sidelink-enabled device, or both, has been synchronized or initialized within a threshold amount of time before positioning of the selected positioning type is to take place: or any combination thereof. The determination of any of these criteria may be made by the first sidelink-enabled device and/or from a data source (e.g., another device, sensor, etc.) of the one or more data sources from which the data is obtained. In some embodiments and/or scenarios, the first sidelink-enabled device may comprise the target node, and a second sidelink-enabled device (discussed in more detail below, with regard to the functionality of block 630) may comprise the source node. Alternatively, the first sidelink-enabled device may comprise the source node, and is the second sidelink-enabled device that may comprise the target node. In cases where the first sidelink-enabled device comprises the source node and the second sidelink-enabled device comprises the target node, one of the data sources from which data regarding one or more criteria is obtained may comprise the second sidelink-enabled device. Means for performing the functionality at block 610 may include one or more software and/or hardware components of a vehicle, such as a bus 9001, processor(s) 910, memory 960, wireless transceiver 930, GNSS receiver 970, and/or other software and/or hardware components of a sidelink-enabled device 900 as illustrated in FIG. 9, which is described in more detail below:

The functionality at block 620 comprises selecting, with the first sidelink-enabled device, a positioning type from the group consisting of RTT-based positioning and SS-based positioning, based on the data. As noted, this may comprise taking the criteria for using either RTT-based positioning or SS-based positioning into account. In some instances, for example, a single criterion on may be sufficient for selecting RTT-based positioning (or SS-based positioning). In other instances, multiple criteria may be balanced/weighed to determine the selection.

Figure 9:
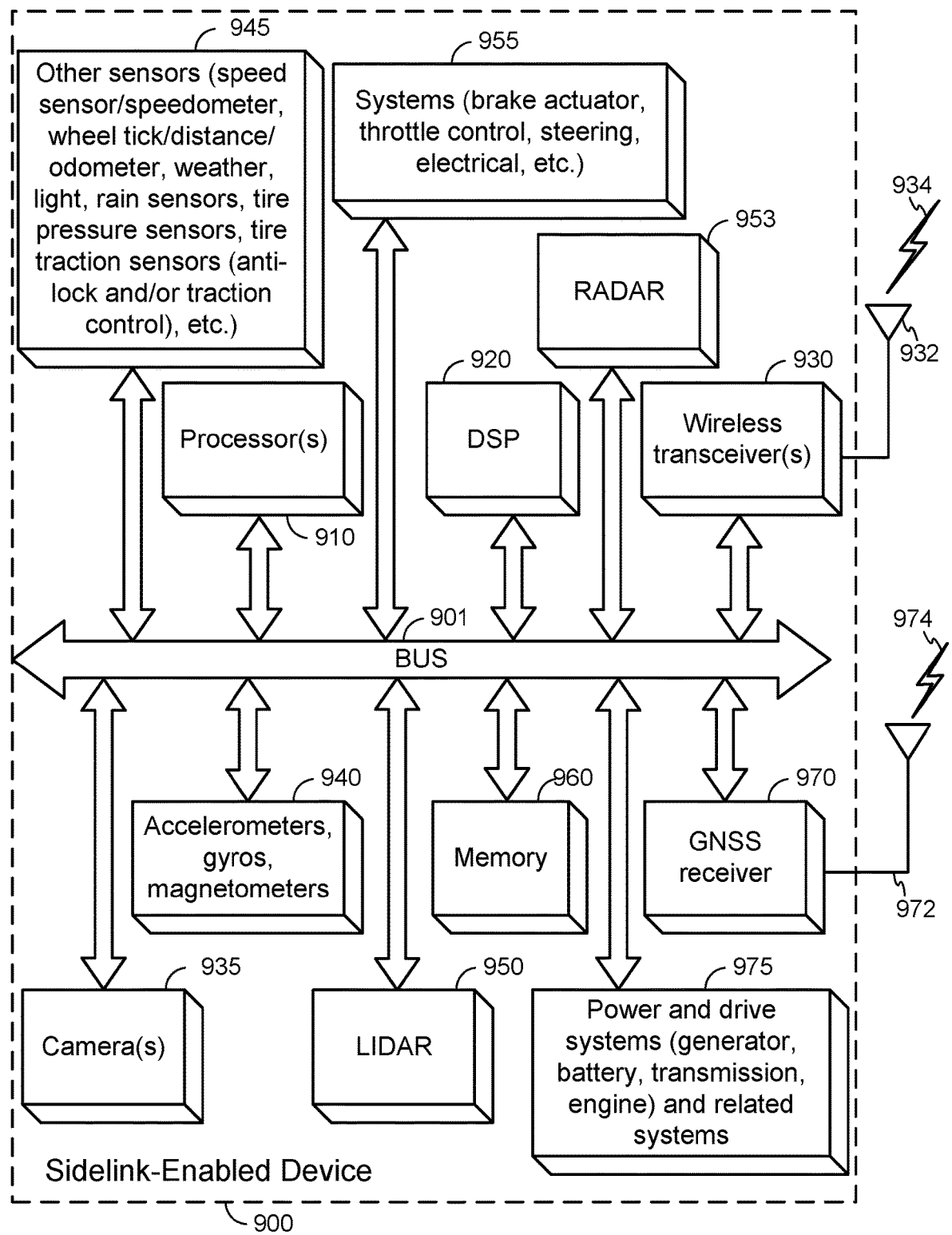
FIG. 9 is a block diagram of various hardware and software components of a sidelink-enabled device, according to an embodiment.

Means for performing the functionality at block 620 may include one or more software and/or hardware components of a vehicle, such as a bus 901, processor(s) 910, memory 960, and/or other software and/or hardware components of a sidelink-enabled device 900 as illustrated in FIG. 9, which is described in more detail below.

The functionality of block 630 comprises sending a message from the first sidelink-enabled device to a second sidelink-enabled device, wherein the message includes information indicative of the selected positioning type. As noted, this indication may comprise using one or more bits to indicate the selected positioning type. It some embodiments, for instance, the information indicative of the selected positioning type included in the message consists of two bits within the message (e.g., as indicated in Table 1). Additionally or alternatively, the message may be sent using MAC-CE or second stage control format. According to some embodiments, the message may comprise an ITS message.

Means for performing the functionality at block 630 may include one or more software and/or hardware components of a vehicle, such as a bus 901, processor(s) 910, memory 960, wireless transceiver 930, GNSS receiver 970, and/or other software and/or hardware components of a sidelink-enabled device 900 as illustrated in FIG. 9, which is described in more detail below.

As indicated in the embodiments above, alternative embodiments may include additional functions. For example, where the first sidelink-enabled device comprises a source node and the second sidelink-enabled device comprises the target node, embodiments of the method 600 may further comprise sending a PRS from the first sidelink-enabled device, in accordance with the selected positioning type. Additionally or alternatively, obtaining the data from the one or more data sources may comprise obtaining information from the target node. Moreover, in some embodiments, the information from the target node may comprise an indication of a positioning type selection from the target node. In such instances, selecting the position type (e.g., the functionality at block 620) may be further based on the positioning type selection from the target node, as shown in the method 500 illustrated in FIG. 5.

FIGS. 7-10 are illustrations of systems, structural devices, vehicle components, and other devices, components, and systems that can be used to implement the techniques provided herein for sidelink positioning, as it relates to V2X (although, as noted, embodiments are not necessarily limited to V2X applications). In the description below, references to V2X systems and devices can include systems and devices employing sidelink communications. Accordingly, in the description below, vehicles, mobile devices, and RSUs may each comprise a sidelink-enabled (or more specifically, a V2X-enabled/CV2X-enabled) device.

Figure 7:
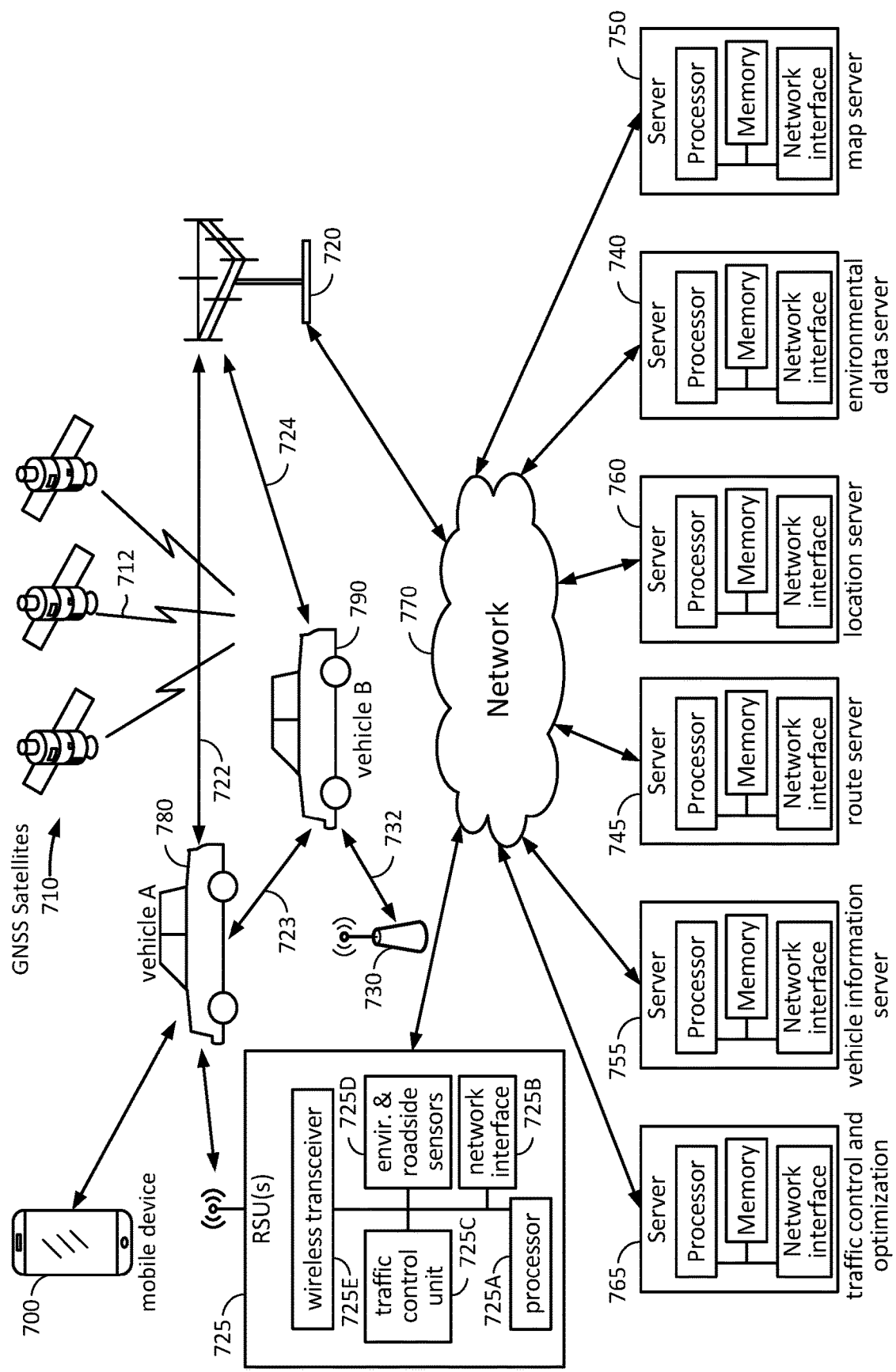
FIG. 7 is an illustration of a system in which vehicles may communicate over various networks and with various devices, vehicles, and servers, according to an embodiment.

FIG. 7 is an illustration of a system in which vehicles may communicate over various networks and with various devices, vehicles, and servers, according to an embodiment. In an embodiment, V2X vehicle A 780 may communicate, using V2X or other wireless communication transceiver over link 723, with V2X or otherwise communication-transceiver-enabled vehicle B 790, for example, in an embodiment to perform inter-vehicle relative positioning, negotiation for lane changes or for passage through an intersection, and to exchange V2X data elements such as GNSS measurements, vehicle status, vehicle location and vehicle abilities, measurement data, and/or calculated status, and to exchange other V2X vehicle status steps that may not be covered in the V2X capability data elements. In an embodiment, vehicle A 780 may also communicate with vehicle B 790 through a network, for example, via wireless signals 722/724 to/from base station 720 and/or via wireless signals 732 to/from an access point 730, or via one or more communication-enabled RSU(s) 725, any of which may relay communication, information and/or convert protocols for use by other vehicles, such as vehicle B 790, particularly in an embodiment where vehicle B 790 is not capable of communicating directly with vehicle A 780 in a common protocol. In an embodiment, RSU(s) may comprise various types of roadside beacons, traffic and/or vehicular monitors, traffic control devices, and location beacons.

In an embodiment, RSU(s) 725 may have a processor 725A configured to operate wireless transceiver 725E to send and receive wireless messages, for example, a Basic Safety Message (BSM) or Cooperative Awareness Messages (CAM) or other V2X messages to/from vehicle A 780 and/or vehicle B 790, from base station 720 and/or access point 730. For example, wireless transceiver 725E may send and/or receive wireless messages in various protocols such as V2X communication with vehicles (e.g., using sidelink communication), and/or using various Wide Area Network (WAN), Wireless Local Area Network (WLAN), and/or Personal Area Network (PAN) protocols to communicate over a wireless communication network. In an embodiment RSU(s) 725 may contain one or more processors 725A communicatively coupled to wireless transceiver 725E and memory, and may contain instructions and/or hardware to perform as a traffic control unit 725C and/or to provide and/or process environmental and roadside sensor information 725D or to act as a location reference for GNSS relative location between it and vehicles. In an embodiment, RSU(s) 725 may contain a network interface 725B (and/or a wireless transceiver 725E), which, in an embodiment, may communicate with external servers such as traffic optimization server 765, vehicle information server 755, and/or environmental data server 740. In an embodiment, wireless transceiver 725E may communicate over a wireless communication network by transmitting or receiving wireless signals from a wireless Base Transceiver Subsystem (BTS), a Node B or an evolved NodeB (eNodeB) or a next generation NodeB (gNodeB) over a wireless communication link. In an embodiment, wireless transceiver(s) 725E may comprise various combinations of WAN, WLAN and/or PAN transceivers. In an embodiment, a local transceiver may also be a Bluetooth® transceiver, a ZigBee transceiver, or other PAN transceiver. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a WLAN (e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with an RSU(s) 725 over a wireless link, and claimed subject matter is not limited in this respect.

RSU(s) 725 may receive location, status, GNSS, and other sensor measurements and capability information from vehicle A 780 and/or vehicle B 790 such as GNSS measurements, sensor measurements, velocity, heading, location, stopping distance, priority, or emergency status and/or other vehicle-related information. In an embodiment, environmental information such as road surface information/status, weather status, and camera information may be gathered and shared with vehicles, either via point to point or broadcast messaging. RSU(s) 725 may utilize received information, via wireless transceiver 725E, from vehicle A 780 and/or vehicle B 790, environmental and roadside sensors 725D, and network information and control messages from, for example, traffic control and optimization server 765 to coordinate and direct traffic flow and to provide environmental, vehicular, safety, and announcement messages to vehicle A 780 and vehicle B 790.

Processor 725A may be configured to operate a network interface 725B, in an embodiment, which may be connected via a backhaul to network 770, and which may be used, in an embodiment, to communicate and coordinate with various centralized servers such as a centralized traffic control and optimization server 765 that monitors and optimizes the flow of traffic in an area such as within a city or a section of a city or in a region. Network interface 725B may also be utilized for remote access to RSU(s) 725 for crowd sourcing of vehicle data, maintenance of the RSU(s) 725, and/or coordination with other RSU(s) 725 or other uses. RSU(s) 725 may have a processor 725A configured to operate traffic control unit 725C which may be configured to process data received from vehicles such as vehicle A 780 and vehicle B 790 such as location data, stopping distance data, road condition data, identification data and other information related to the status and location of nearby vehicles and environment. RSU(s) 725 may have a processor 725A configured to obtain data from environmental and roadside sensors 725D, which may include temperature, weather, camera, pressure sensors, road sensors (for car detection, for example), accident detection, movement detection, speed detection, and other vehicle and environmental monitoring sensors.

In an embodiment, vehicle A 780 may also communicate with mobile device 700 using short range communication and personal networks such as Bluetooth, Wi-Fi or Zigbee or via V2X (e.g., CV2X/sidelink communications) or other vehicle-related communication protocols, for example, in an embodiment to access WAN and/or Wi-Fi networks and/or, in an embodiment, to obtain sensor and/or location measurements from mobile device 700. In an embodiment, vehicle A 780 may communicate with mobile device 700 using WAN related protocols through a WAN network, such as via WAN base station 720 or using Wi-Fi either directly peer to peer or via a Wi-Fi access point. Vehicle A 780 and/or vehicle B 790 may communicate using various communication protocols. In an embodiment, vehicle A 780 and/or vehicle B 790 may support various and multiple modes of wireless communication such as, for example, using V2X, Global System for Mobile Communications (GSM), Wideband Code Division Multiple Access (WCDMA), Code-division multiple access (CDMA), High Rate Packet Data (HRPD), Wi-Fi, Bluetooth, WiMAX, LTE, 5G new radio access technology (NR) communication protocols, etc.

In an embodiment, vehicle A may communicate over WAN networks using WAN protocols via base station 720 or with wireless LAN access point 730 using wireless LAN protocols such as Wi-Fi. A vehicle may also support wireless communication using a WLAN, PAN (such as Bluetooth or ZigBee), Digital Subscriber Line (DSL) or packet cable for example.

Vehicle A 780 and/or vehicle B 790, in an embodiment, may contain one or more GNSS receivers such as GNSS receiver 970 for reception of GNSS signals 712, from GNSS satellites 710, for location determination, time acquisition and time maintenance. Various GNSS systems may be supported alone or in combination, using GNSS receiver 970 or other receiver, to receive signals from Beidou, Galileo, GLObal NAvigation Satellite System (GLONASS), and/or Global Positioning System (GPS), and various regional navigational systems such as Quasi-Zenith Satellite System (QZSS) and NavIC or Indian Regional Navigation Satellite System (IRNSS). Other wireless systems may be utilized such as those depending on beacons such as, in an example, one or more RSU(s) 725, one or more wireless LAN access point 730 or one or more base stations 720. Various GNSS signals 712 may be utilized in conjunction with car sensors to determine location, velocity, proximity to other vehicles such as between vehicle A 780 and vehicle B 790.

In an embodiment, vehicle A and/or vehicle B may access GNSS measurements and/or locations determined at least in part using GNSS as provided by mobile device 700, which, in an embodiment would also have GNSS, WAN, Wi-Fi and other communications receivers and/or transceivers. In an embodiment, vehicle A 780 and/or vehicle B 790 may access GNSS measurements (such as pseudorange measurements, Doppler measurements and satellite IDs) and/or locations determined at least in part using GNSS as provided by mobile device 700 as a fallback in case GNSS receiver 970 fails or provides less than a threshold level of location accuracy.

Vehicle A 780 and/or vehicle B 790 may access various servers on the network such as vehicle information server 755, route server 745, location server 760, map server 750, and environmental data server 740.

Vehicle information server 755, may provide information describing various vehicles such as antenna location, vehicle size and vehicle capabilities, as may be utilized in making decisions in regards to maneuvers relative to nearby cars such as whether they are capable of stopping or accelerating in time, whether they are autonomously driven, autonomous driving capable, communications capable. In an embodiment, vehicle information server 755 may also provide information in regard to vehicle size, shape, capabilities, identification, ownership, occupancy, and/or determined location point (such as, for example, the location of the GNSS receiver) and the location of the car boundaries relative to the determined location point.

Route server 745, may receive current location and destination information, and provide routing information for the vehicle, map data, alternative route data and/or traffic and street conditions data.

Location server 760, in an embodiment, may provide location determination capabilities, transmitter signal acquisition assistance (such as GNSS satellite orbital predictions information, time information, approximate location information and/or approximate time information), transceiver almanacs such as those containing identification of and location for Wi-Fi access points and base stations, and, in some embodiments, additional information relative to the route such as speed limits, traffic, and road status/construction status. Map server 750 which may provide map data, such as road locations, points of interest along the road, address locations along the roads, road size, road speed limits, traffic conditions, and/or road conditions (wet, slippery, snowy/icy, etc.), road status (open, under construction, accidents, etc.). Environmental data server 740 may, in an embodiment, provide weather and/or road related information, traffic information, terrain information, and/or road quality & speed information and/or other pertinent environmental data.

In an embodiment, vehicles 780 and 790 and mobile devices 700, in FIG. 7, may communication over network 770 via various network access points such as wireless LAN access point 730 or wireless WAN base station 720 over network 770. Vehicles 780 and 790 and mobile devices 700 may also, in some embodiments, communicate directly between devices, between vehicles and device to vehicle and vehicle to device using various short range communications mechanisms to communicate directly without going over network 770, such as via Bluetooth, Zigbee and 5G new radio standards.

Figure 8:
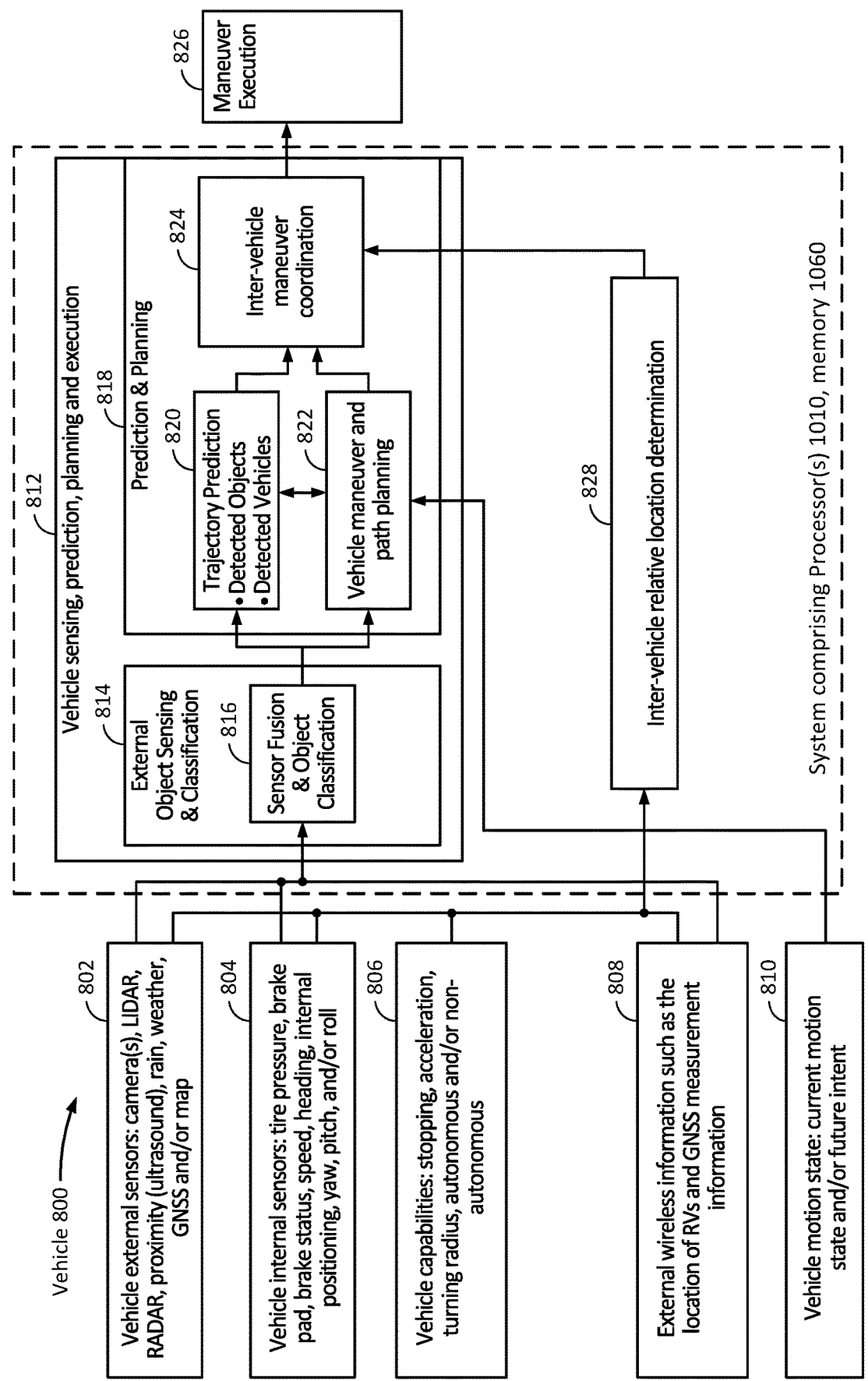
FIG. 8 comprises a functional block diagram of a vehicle, according to an embodiment.

FIG. 8 comprises a functional block diagram of a vehicle 800, according to an embodiment. As noted, a vehicle 800 may comprise a type of sidelink-enabled device. Accordingly, example hardware and/or software components for executing the blocks shown in FIG. 8 are illustrated in FIG. 9 and described in more detail below.

As shown in FIG. 8, vehicle 800 may receive vehicle and environment information from vehicle external sensors 802, vehicle internal sensors 804, vehicle capabilities 806, external wireless information such as the location of other vehicles and GNSS measurement information 808 (from the environment, from other vehicles, from RSU(s), from system servers) and/or from vehicle motion state 810 (describing current and/or future motion states). The received vehicle, sensor, and environment information may, in an embodiment, be processed in one or more processor(s) 910, DSP(s) 920, and memory 960 (shown in FIG. 9), connected and configured to provide external object sensing and classification, prediction and planning, and maneuver execution, as well as to determine and update V2X or other wireless data element values, including GNSS data element values, and to transmit, via one or more wireless transceivers 930, messaging including the determined data elements. The messaging and data elements may be sent and received via various means, protocols and standards, such as via Society of Automotive Engineers (SAE) or European Telecommunications Standards Institute (ETSI) CV2X messages and/or other wireless V2X protocols supported by wireless transceiver(s) 930.

Inter-vehicle relative location determination block 828 may be used to determine relative location of vehicles in an area of interest. In an embodiment, GNSS data is exchanged with vehicles, or other devices such as RSUs, to determine and/or verify and/or increase the accuracy of a relative location associated with other vehicles or devices. In one embodiment, determining vehicles (or other devices) within an area of interest may utilize broadcast location information such as broadcast latitude and longitude received in messages from other vehicles other devices and location information for vehicle 800 to determine an approximate relative location and/or an approximate range between vehicles.

In an embodiment, other vehicle-related input sources, such as servers 755, 745, 760, 750, and 740, may provide information such as vehicle information, routing, location assistance, map data and environmental data and provide input on and/or complement and/or be used in conjunction with the other inputs, for example road location data, map data, driving condition data and other vehicle-related data inputs, used in conjunction with inter-vehicle maneuver coordination 824 to determine maneuver execution 826. In an embodiment, the map data may include locations of roadside units relative to the road location, where the vehicle may utilize relative positioning between an RSU in combination with the map data to determine positioning relative to the road surface, particularly in situations where other systems may fail such as due to low visibility weather conditions (snow, rain, sandstorm, etc.). In an embodiment, map data from map server 750) may be utilized in conjunction with relative and/or absolute data from neighboring vehicles and/or from RSU(s) 725 to determine high confidence absolute location for a plurality of vehicles and relative location with respect to the road/map. For example, if vehicle A 780 has high accuracy/high confidence location than other vehicles in communication with vehicle A 780, such as vehicle B 790, other vehicles may use GNSS information for a highly accurate relative location and the highly accurate location from vehicle A 780 sent to vehicle B 790 to determine a highly accurate location for vehicle B 790, even if the systems of vehicle B 790 are otherwise unable to calculate a highly accurate location in a particular situation or environment. In this situation, the presence of vehicle A with a highly accurate location determination system provides benefits to all surrounding vehicles by sharing one or more highly accurate locations along with ongoing relative location information. Furthermore, assuming the map data from map server 750 is accurate, the ability to propagate highly accurate location data from vehicle A 780 to surrounding vehicles such as vehicle B 790 enables the surrounding vehicles to also accurately determine their relative location versus the map data, even in otherwise troublesome signal/location environments. Vehicle information server 755 may provide vehicle information such as size, shape, and antenna location which may be utilized, for example, by vehicle A or other vehicles to determine not just the relative location between the GNSS receiver on vehicle A 780 and, for example, vehicle B 790, but also the distance between the closest points of vehicle A 780 and vehicle B 790. In an embodiment, traffic information from the traffic control and optimization server 765 may be utilized to determine overall path selection and rerouting, used in conjunction with route server 745 (in an embodiment). In an embodiment, environmental data server 740 may provide input on road conditions, black ice, snow; water on the road, and other environmental conditions which may also impact the decisions and decision criteria in inter-vehicle maneuver coordination block 824 and maneuver execution block 826. For example, in icy or rainy conditions, the vehicle 800 may execute and/or request increased inter-vehicle distance from adjacent vehicles or may choose route options that avoid road hazard conditions such as black ice and standing water.

Block 828 may be implemented using various dedicated or generalized hardware and software, such as using processor 910 and/or DSP 920 and memory 960 (again, as shown in FIG. 9) or, in an embodiment, in specialized hardware blocks such as dedicated sensor processing and/or vehicle messaging cores. According to some embodiments, the location of nearby vehicles may be determined through various means such as based on signal-based timing measurements such RTT and SS (as described in the embodiments above), and/or Time Of Arrival (TOA), signal strength of a broadcast signal for vehicles, and a distance determined based upon broadcast latitude and longitude from a neighboring vehicle and the current location of the vehicle. Additionally or alternatively, location of nearby vehicles may be determined from sensor measurements such as Light Detection And Ranging (LIDAR), RAdio Detection And Ranging (RADAR), SONAR, and camera measurements. In an embodiment, some or all of blocks 802, 804, 806, 808, and/or 810 may have dedicated processing cores, for example, to improve performance and reduce measurement latency. In an embodiment, some or all of blocks 802, 804, 806, 808, and/or 810 may share processing with block 828.

Vehicle external sensors 802 may comprise, in some embodiments, cameras, LIDAR, RADAR, proximity sensors, rain sensors, weather sensors, GNSS receivers 970, and received data used with the sensors such as map data, environmental data, location, route, and/or other vehicle information such as may be received from other vehicles, devices and servers such as, in an embodiment, map server 750, route server 745, vehicle information server 755, environmental data server 740, location server 760, and/or from associated devices such as mobile device 700, which may be present in or near to the vehicle such as vehicle A 780. For example, in an embodiment, mobile device 700 may provide an additional source of GNSS measurements, may provide an additional source of motion sensor measurements, or may provide network access as a communication portal to a WAN, Wi-Fi or other network, and as a gateway to various information servers such as servers 740, 745, 750, 755, 760, and/or 765.

Figure 10:
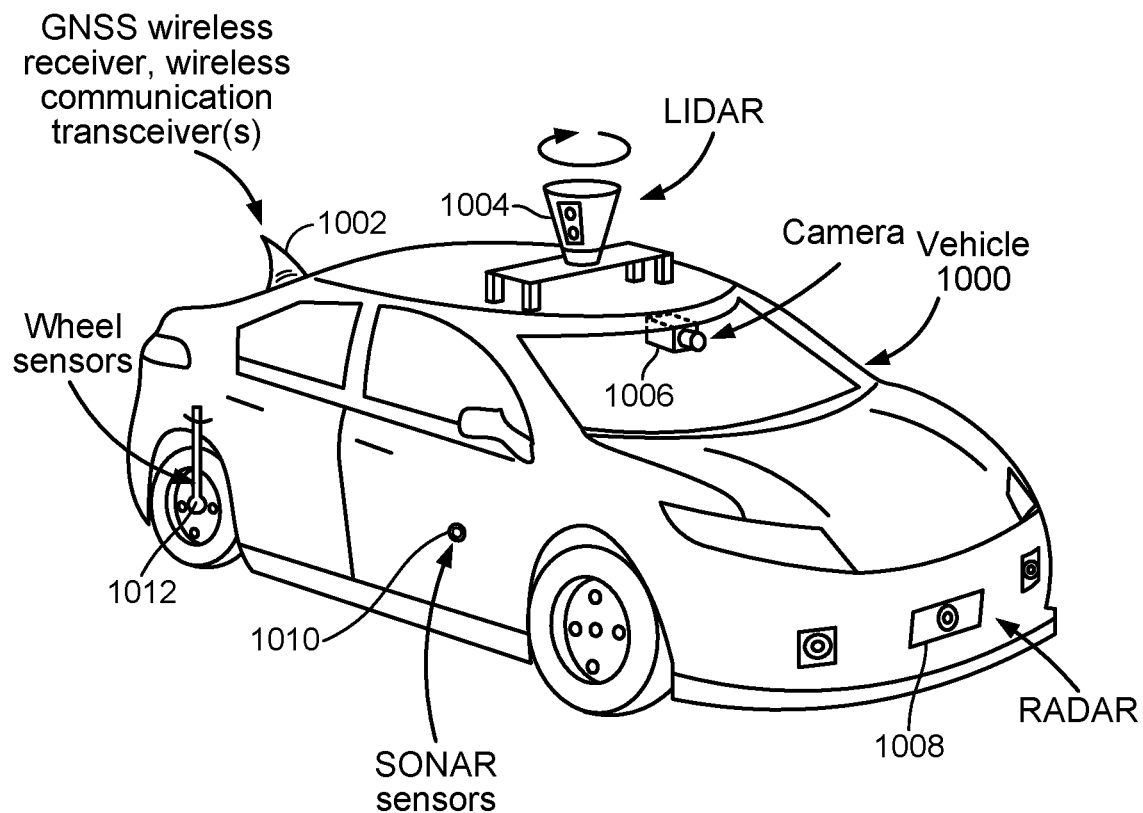
FIG. 10 is a perspective view of an example vehicle, according to an embodiment.

It is understood that the vehicle 800 may contain one or a plurality of cameras. In an embodiment, a camera may be front facing, side facing, rear facing or adjustable in view (such as a rotatable camera). As shown in FIG. 10, for example, there may be multiple cameras 1006 facing the same plane. For example, the cameras 1006 and bumper-mounted camera at 1008 may comprise two front facing cameras, one focused on lower objects and/or a lower point of view (such as bumper mounted) for parking purposes and one focusing on a higher point of view such as to track traffic, other vehicles, pedestrians and more distant objects. In an embodiment, various views may be stitched and/or may be correlated against other inputs such as V2X input from other vehicles to optimize tracking of other vehicles and external entities and objects and/or to calibrate sensor systems against each other. LIDAR 1004 may be roof mounted and rotating or may be focused on a particular point of view (such as front facing, rear facing, side facing). LIDAR 1004 may be solid state or mechanical. Proximity sensors may be ultrasonic, RADAR-based, light-based (such as based on infrared range finding), and/or capacitive (surface touch oriented or capacitive detection of metallic bodies). Rain and weather sensors may include various sensing capabilities and technologies such as barometric pressure sensors, moisture detectors, rain sensors, and/or light sensors and/or may leverage other pre-existing sensor systems. GNSS receivers may be roof-mounted, such as in the fin antenna assembly at the rear of the roof of a car, hood or dash mounted or otherwise placed within the exterior or interior of the vehicle.

In an embodiment, vehicle internal sensors 804 may comprise wheel sensors 1012 such as tire pressure sensors, brake pad sensors, brake status sensors, speedometers, and other speed sensors, heading sensors and/or orientation sensors such as magnetometers and geomagnetic compasses, distance sensors such as odometers and wheel tic sensors, inertial sensors such as accelerometers and gyros as well as inertial positioning results using the above-mentioned sensors, and yaw, pitch, and/or roll sensors as may be determined individually or as determined using other sensor systems such as accelerometers, gyros and/or tilt sensors.

Both vehicle internal sensors 804 and vehicle external sensors 802 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values or send values to block 828 to determine vehicle location. The car status values derived from measurements from internal and external sensors may be further combined with car status values and/or measurements from other sensor systems using a general or applications processor. For example, blocks 828 and/or 824 may be implemented on a dedicated or a centralized processor to determine data element values for V2X messaging which may be sent utilizing wireless transceivers 930 or via other communication transceivers. In an embodiment, the sensors may be segregated into related systems, for example, LIDAR, RADAR, motion, wheel systems, etc., operated by dedicated core processing for raw results to output car status values from each core that are combined and interpreted to derive combined car status values, including capability data elements and status data elements, that may be used to control or otherwise affect car operation and/or as messaging steps shared with other vehicles and/or systems via V2X or other messaging capabilities. These messaging capabilities may be based on, in an embodiment, a variety of wireless-related, light-related or other communication standards, such as those supported by wireless transceiver(s) 930 and antenna(s) 932.

In an embodiment, vehicle capabilities 806 may comprise performance estimates for stopping, breaking, acceleration, and turning radius, and autonomous and/or non-autonomous status and/or capability or capabilities. The capability estimates may be based upon stored estimates, which may be loaded, in an embodiment, into memory. These estimates may be based on empirical performance numbers, either for a specific vehicle, or for averages across one or more vehicles, and/or one or more models for a given performance figure. Where performance estimates for multiple models are averaged or otherwise combined, they may be chosen based on similar or common features. For example, vehicles with similar or the same weight and the same or similar drive train may share performance estimates for drive-performance related estimates such as breaking/stopping distance, turning radius, and acceleration performance. Vehicle performance estimates may also be obtained, for example, using external V2X input(s) 808, over a wireless network from vehicular data servers on the network. This is particularly helpful to obtain information for vehicles that are not wireless capable and cannot provide vehicular information directly. In an embodiment, vehicle capabilities 806 may also be influenced by car component status such as tire wear, tire brand capabilities, brake pad wear, brake brand and capabilities, and engine status. In an embodiment, vehicle capabilities 806 may also be influenced by overall car status such as speed, heading and by external factors such as road surface, road conditions (wet, dry, slipperiness/traction, etc.), weather (windy, rainy, snowing, black ice, slick roads, etc.). In many cases, wear, or other system degradation, and external factors such as weather, road surface, road conditions, etc. may be utilized to reduce, validate or improve performance estimates. In some embodiments, actual measured vehicle performance such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions such as in the same type of weather or on the same type of road surface as is currently detected by the vehicle, such as via vehicle external sensors 802 and/or vehicle internal sensors 804, may be weighted more heavily and/or given preference in determining capability.

V2X vehicle sensing, prediction, planning execution 812 handles the receipt and processing of information from blocks 802, 804, 806, 808, and 810, via external object sensing and classification block 814, in part utilizing sensor fusion and object classification block 816 to correlate, corroborate and/or combine data from input blocks 802, 804, 806, 808, and 810. Block 814 external object sensing and classification determines objects present, determines type of objects (car, truck, bicycle, motorcycle, pedestrian, animal, etc.) and/or object status relative to the vehicle, such as movement status, proximity, heading, and/or position relative to the vehicle, size, threat level, and vulnerability priority (a pedestrian would have a higher vulnerability priority versus road litter, for example). In an embodiment, block 814 may utilize GNSS measurements messages from other vehicles to determine the relative positioning to other vehicles. This output from block 814 may be provided to prediction and planning block 818, which determines detected objects and vehicles and their associated trajectory via block 820 and determines vehicle maneuver and path planning in block 822, the outputs of which are utilized in block 826 vehicle maneuver execution either directly or via V2X inter-vehicle negotiation block 824, which would integrate and account for maneuver planning, location and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, negotiation for access to directional travel on a single lane road or to pass another vehicle. Inter-vehicle negotiation may also include time-based and/or distance-based factors such as appointment time, destination distance and estimated route time to reach destination, and, in some embodiments, type of appointment and importance of the appointment.

FIG. 9 is a block diagram of various hardware and software components of a sidelink-enabled device 900, according to an embodiment. Again, a vehicle (e.g., vehicle A 780, vehicle B 790), mobile device (e.g., mobile device 700), and/or RSU (e.g., RSU(s) 725) may comprise a sidelink-enabled device 900. Because the sidelink-enabled device 900 may be incorporated into a vehicle, various components illustrated in FIG. 9 are directed toward vehicle applications. Accordingly, for embodiments in which the sidelink-enabled device 900 is incorporated into a mobile device or RSU, the sidelink-enabled device 900 may not include such components.

For embodiments in which the sidelink-enabled device 900 is incorporated into a vehicle, the vehicle may comprise for example, a car, truck, motorcycle, and/or other motorized vehicle, may transmit radio signals to, and receive radio signals from, other sidelink-enabled devices, for example, via V2X car to car communication (for example, using one of the CV2X vehicle to vehicle communication protocols), and/or from a wireless communication network 770, in an embodiment, via WAN, base station 720, and/or wireless access point 730, and/or from RSU(s) 725. In one example, sidelink-enabled device 900 (e.g., vehicle 780) may communicate, via wireless transceiver(s) 930 and wireless antenna(s) 932 with other vehicles (e.g., vehicle 790) and/or wireless communication networks by communicating using wireless signals over a wireless communication link with a remote wireless transceiver, which may integrated into another vehicle 790, RSU(s) 725, mobile device 700, a base station 720 (e.g., a NodeB, eNodeB, or gNodeB), or wireless access point 730.

According to some embodiments, the sidelink-enabled device 900 may transmit wireless signals to, or receive wireless signals from, a local transceiver over a wireless communication link, for example, by using a WAN, WLAN, and/or a PAN wireless transceiver (which may be capable of sidelink communications), here represented by one of wireless transceiver(s) 930 and wireless antenna(s) 932. In an embodiment, wireless transceiver(s) 930 may comprise various combinations of WAN, WLAN, and/or PAN transceivers. In an embodiment, wireless transceiver(s) 930 may also comprise a Bluetooth transceiver, a ZigBee transceiver, or other PAN transceiver. In an embodiment, sidelink-enabled device 900 may transmit wireless signals to, or receive wireless signals from, a wireless transceiver 930 on a sidelink-enabled device 900 over wireless communication link 934. A local transceiver, a WAN wireless transceiver and/or a mobile wireless transceiver may comprise a WAN transceiver, an access point (AP), femtocell, Home Base Station, small cell base station, HNB, HeNB, or gNodeB and may provide access to a WLAN (e.g., IEEE 802.11 network), a wireless personal area network (PAN, e.g., Bluetooth network), a cellular network (e.g. an LTE network or other wireless wide area network such as those discussed in the next paragraph), and/or sidelink-enabled devices (e.g., cellular devices capable of communicating directly via a WAN transceiver using sidelink communications). Of course, it should be understood that these are merely examples of networks that may communicate with a vehicle over a wireless link, and claimed subject matter is not limited in this respect. In an embodiment, GNSS signals 974 from GNSS Satellites are utilized by sidelink-enabled device 900 for location determination and/or for the determination of GNSS signal parameters and demodulated data. In an embodiment, signals 934 from WAN transceiver(s), WLAN, and/or PAN local transceivers are used for location determination, alone or in combination with GNSS signals 974.

Examples of network technologies that may support wireless transceivers 930 are GSM, CDMA, WCDMA, LTE, 5G or New Radio Access Technology (NR), HRPD, and V2X car-to-car communication. As noted, V2X communication protocols may be defined in various standards such as SAE and ETS-ITS standards. GSM, WCDMA, and LTE are technologies defined by 3GPP. CDMA and HRPD are technologies defined by the $3^{rd}$ Generation Partnership Project II (3GPP2). WCDMA is also part of the Universal Mobile Telecommunications System (UMTS) and may be supported by an HNB.

Wireless transceivers 930 may communicate with communications networks via WAN wireless base stations which may comprise deployments of equipment providing subscriber access to a wireless telecommunication network for a service (e.g., under a service contract). Here, a WAN wireless base station may perform functions of a WAN or cell base station in servicing subscriber devices within a cell determined based, at least in part, on a range at which the WAN wireless base station is capable of providing access service. Examples of WAN base stations include GSM, WCDMA, LTE, CDMA, HRPD, Wi-Fi, Bluetooth, WiMAX, 5G NR base stations. In an embodiment, further wireless base stations may comprise a WLAN and/or PAN transceiver.

In an embodiment, sidelink-enabled device 900 may contain one or more cameras 935. In an embodiment, the camera may comprise a camera sensor and mounting assembly. Different mounting assemblies may be used for different cameras on sidelink-enabled device 900. For example, front facing cameras may be mounted in the front bumper, in the stem of the rear-view mirror assembly or in other front facing areas of the sidelink-enabled device 900. Rear facing cameras may be mounted in the rear bumper/fender, on the rear windshield, on the trunk or other rear facing areas of the vehicle. The side facing mirrors may be mounted on the side of the vehicle such as being integrated into the mirror assembly or door assemblies. The cameras may provide object detection and distance estimation, particularly for objects of known size and/or shape (e.g., a stop sign and a license plate both have standardized size and shape) and may also provide information regarding rotational motion relative to the axis of the vehicle such as during a turn. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system. Similarly, when combined with, for example, accelerometers, impact time with road hazards, may be estimated (elapsed time before hitting a pot hole for example) which may be verified against actual time of impact and/or verified against stopping models (for example, compared against the estimated stopping distance if attempting to stop before hitting an object) and/or maneuvering models (verifying whether current estimates for turning radius at current speed and/or a measure of maneuverability at current speed are accurate in the current conditions and modifying accordingly to update estimated parameters based on camera and other sensor measurements).

Accelerometers, gyros and magnetometers 940, in an embodiment, may be utilized to provide and/or verify motion and directional information. Accelerometers and gyros may be utilized to monitor wheel and drive train performance. Accelerometers, in an embodiment, may also be utilized to verify actual time of impact with road hazards such as potholes relative to predicted times based on existing stopping and acceleration models as well as steering models. Gyros and magnetometers may, in an embodiment, be utilized to measure rotational status of the vehicle as well as orientation relative to magnetic north, respectively, and to measure and calibrate estimates and/or models for turning radius at current speed and/or a measure of maneuverability at current speed, particularly when used in concert with measurements from other external and internal sensors such as other sensors 945 such as speed sensors, wheel tick sensors, and/or odometer measurements.

LIDAR 950 uses pulsed laser light to measure ranges to objects. While cameras may be used for object detection, LIDAR 950 provides a means, to detect the distances (and orientations) of the objects with more certainty, especially in regard to objects of unknown size and shape. LIDAR 950 measurements may also be used to estimate rate of travel, vector directions, relative position and stopping distance by providing accurate distance measurements and delta distance measurements.

Memory 960 may be utilized with processor 910 and/or DSP 920. which may comprise Random Access Memory (RAM), Read-Only Memory (ROM), disc drive, FLASH, or other memory devices or various combinations thereof. In an embodiment, memory 960 may contain instructions to implement various methods described throughout this description including, for example, processes to implement the use of relative positioning between vehicles and between vehicles and external reference objects such as roadside units. In an embodiment, memory may contain instructions for operating and calibrating sensors, and for receiving map, weather, vehicular (both sidelink-enabled device 900 and surrounding vehicles) and other data, and utilizing various internal and external sensor measurements and received data and measurements to determine driving parameters such as relative position, absolute position, stopping distance, acceleration and turning radius at current speed and/or maneuverability at current speed, inter-car distance, turn initiation/timing and performance, and initiation/timing of driving operations.

In an embodiment, power and drive systems (generator, battery, transmission, engine) and related systems 975 and systems (brake, actuator, throttle control, steering, and electrical) 955 may be controlled by the processor(s) and/or hardware or software or by an operator of the vehicle or by some combination thereof. The systems (brake, actuator, throttle control, steering, electrical, etc.) 955 and power and drive or other systems 975 may be utilized in conjunction with performance parameters and operational parameters, to enable autonomously (and manually, relative to alerts and emergency overrides/braking/stopping) driving and operating a sidelink-enabled device 900 safely and accurately, such as to safely, effectively and efficiently merge into traffic, stop, accelerate and otherwise operate the sidelink-enabled device 900. In an embodiment, input from the various sensor systems such as camera 935, accelerometers, gyros and magnetometers 940, LIDAR 950, GNSS receiver 970, RADAR 953, input, messaging and/or measurements from wireless transceiver(s) 930 and/or other sensors 945 or various combinations thereof, may be utilized by processor 910 and/or DSP 920 or other processing systems to control power and drive systems 975 and systems (brake actuator, throttle control, steering, electrical, etc.) 955.

A GNSS receiver 970 may be utilized to determine position relative to the earth (absolute position) and, when used with other information such as measurements from other objects and/or mapping data, to determine position relative to other objects such as relative to other vehicles and/or relative to the road surface. To determine position, the GNSS receiver 970, may receive RF signals 974 from GNSS satellites (e.g., RF signals 712 from GNSS satellites 710) using one or more antennas 972 (which, depending on functional requirements, may be the same as antennas 932). The GNSS receiver 970 may support one or more GNSS constellations as well as other satellite-based navigation systems. For example, in an embodiment, GNSS receiver 970 may support global navigation satellite systems such as GPS, the GLONASS, Galileo, and/or BeiDou, or any combination thereof. In an embodiment, GNSS receiver 970 may support regional navigation satellite systems such as NavIC or QZSS or combinations thereof as well as various augmentation systems (e.g., Satellite Based Augmentation Systems (SBAS) or ground based augmentation systems (GBAS)) such as Doppler Orbitography and Radio-positioning Integrated by Satellite (DORIS) or wide area augmentation system (WAAS) or the European geostationary navigation overlay service (EGNOS) or the multi-functional satellite augmentation system (MSAS) or the local area augmentation system (LAAS). In an embodiment, wireless receiver(s) 930 and antenna(s) 932 may support multiple bands and sub-bands such as GPS L1, L2, and L5 bands: Galileo E1, E5, and E6 bands: Compass (BeiDou) B1, B3, and B2 bands; GLONASS G1, G2, and G3 bands; and QZSS L1C, L2C and L5-Q bands.

The GNSS receiver 970 may be used to determine location and relative location which may be utilized for location, navigation, and to calibrate other sensors, when appropriate, such as for determining distance between two time points in clear sky conditions and using the distance data to calibrate other sensors such as the odometer and/or LIDAR. In an embodiment, GNSS-based relative locations, based on, for example shared Doppler and/or pseudorange measurements between vehicles, may be used to determine highly accurate distances between two vehicles, and when combined with vehicle information such as shape and model information and GNSS antenna location, may be used to calibrate, validate and/or affect the confidence level associated with information from LIDAR, camera, RADAR, SONAR, and other distance estimation techniques. GNSS Doppler measurements may also be utilized to determine linear motion and rotational motion of the vehicle or of the vehicle relative to another vehicle, which may be utilized in conjunction with gyro and/or magnetometer and other sensor systems to maintain calibration of those systems based upon measured location data. Relative GNSS positional data may also be combined with high confidence absolute locations from RSUs, to determine high confidence absolute locations of the vehicle. Furthermore, relative GNSS positional data may be used during inclement weather that may obscure LIDAR and/or camera-based data sources to avoid other vehicles and to stay in the lane or other allocated road area. For example, using an RSU equipped with GNSS receiver and V2X capability, GNSS measurement data may be provided to the vehicle, which, if provided with an absolute location of the RSU, may be used to navigate the vehicle relative to a map, keeping the vehicle in lane and/or on the road, in spite of lack of visibility.

RADAR 953, uses transmitted radio waves that are reflected off of objects. The reflected radio waves are analyzed, based on the time taken for reflections to arrive and other signal characteristics of the reflected waves to determine the location of nearby objects. RADAR 953 may be utilized to detect the location of nearby cars, roadside objects (signs, other vehicles, pedestrians, etc.) and will generally enable detection of objects even if there is obscuring weather such as snow, rain, or hail. Thus, RADAR 953 may be used to complement LIDAR 950 systems and camera 935 systems in providing ranging information to other objects by providing ranging and distance measurements and information when visual-based systems typically fail. Furthermore, RADAR 953 may be utilized to calibrate and/or sanity check other systems such as LIDAR 950 and camera 935. Ranging measurements from RADAR 953 may be utilized to determine/measure stopping distance at current speed, acceleration, maneuverability at current speed (e.g., turning radius and/or another measure of maneuverability at current speed). In some systems, ground penetrating RADAR may also be used to track road surfaces via, for example, RADAR-reflective markers on the road surface or terrain features such as ditches.

FIG. 10 is a perspective view of an example vehicle 1000, according to an embodiment, capable of communicating using sidelink/V2X communications in the manner in the previously-described embodiments. Here, some of the components discussed with regard to FIG. 9 and earlier embodiments are shown. As illustrated and previously discussed, a vehicle 1000 can have a camera(s) such as rear view mirror-mounted camera 1006, front fender-mounted camera (not shown), side mirror-mounted camera (not shown) and a rear camera (not shown, but typically on the trunk, hatch or rear bumper). Vehicle 1000 may also have LIDAR 1004, for detecting objects and measuring distances to those objects: LIDAR 1004 is often roof-mounted, however, if there are multiple LIDAR units 1004, they may be oriented around the front, rear and sides of the vehicle. Vehicle 1000 may have other various location-related systems such as a GNSS receiver 970 (typically located in the shark fin unit on the rear of the roof, as indicated), various wireless transceivers (such as WAN, WLAN, V2X: typically, but not necessarily, located in the shark fin) 1002, RADAR 1008 (typically in the front bumper), and SONAR 1010 (typically located on both sides of the vehicle, if present). Various wheel 1012 and drive train sensors may also be present, such as tire pressure sensors, accelerometers, gyros, and wheel rotation detection and/or counters. In an embodiment, distance measurements and relative locations determined via various sensors such as LIDAR, RADAR, camera, GNSS, and SONAR, may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, an exact GNSS distance and vector between two GNSS receivers would need to be modified based upon the relative location of the various car surfaces to the GNSS receiver. For example, in determining the distance between a rear car's front bumper and a leading car's rear bumper, the distance would need to be adjusted based on the distance between the GNSS receiver and the front bumper on the following car, and the distance between the GNSS receiver of the front car and the rear bumper of the front car. E.g., the distance between the front car's rear bumper and the following car's front bumper is the relative distance between the two GNSS receivers minus the GNSS receiver to front bumper distance of the rear car and minus the GNSS receiver to rear bumper distance of the front car. It is realized that this list is not intended to be limiting and that FIG. 10 is intended to provide exemplary locations of various sensors in an embodiment of a vehicle comprising a sidelink-enabled device 900.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory (e.g., memory 960 of FIG. 9) can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of sidelink positioning determination and communication, the method comprising: obtaining, at a first sidelink-enabled device, data from one or more data sources indicative of one or more criteria for using either Round-Trip Time (RTT)-based positioning of a target node or Single-Sided (SS)-based positioning of the target node: selecting, with the first sidelink-enabled device, a positioning type from the group consisting of RTT-based positioning and SS-based positioning, based on the data; and sending a message from the first sidelink-enabled device to a second sidelink-enabled device, wherein the message includes information indicative of the selected positioning type.

Clause 2: The method of clause 1, wherein the message comprises an Intelligent Transport System (ITS) message.

Clause 3: The method of any of clauses 1-2, wherein the first sidelink-enabled device comprises a source node and the second sidelink-enabled device comprises the target node.

Clause 4: The method of clause 3, sending a Position Reference Signal (PRS) from the first sidelink-enabled device, in accordance with the selected positioning type.

Clause 5: The method of any of clauses 3-4, wherein obtaining the data from the one or more data sources comprises obtaining information from the target node.

Clause 6: The method of clause 5, wherein the information from the target node comprises an indication of a positioning type selection from the target node, and selecting the position type is further based on the positioning type selection from the target node.

Clause 7: The method of any of clauses 1-2, wherein the first sidelink-enabled device comprises the target node and the second sidelink-enabled device comprises a source node.

Clause 8: The method of any of clauses 1-7, wherein the information indicative of the selected positioning type included in the message consists of two bits within the message.

Clause 9: The method of any of clauses 1-8, wherein the message is sent using Media Access Control-Control Element (MAC-CE) or second stage control format.

Clause 10: The method of any of clauses 1-9, wherein the message comprises a pre-PRS message.

Clause 11: The method of any of clauses 1-10, wherein the one or more criteria comprise: whether relative positions over time between the first sidelink-enabled device and the second sidelink-enabled device fail to exhibit a threshold amount of angular changes: whether a respective speed sensor of the first sidelink-enabled device, the second sidelink-enabled device, or both, is determined to have a variance greater than a threshold value; whether the first sidelink-enabled device, the second sidelink-enabled device, or both, has moved a first threshold distance within a threshold amount of time: whether a relative distance between the first sidelink-enabled device and the second sidelink-enabled device has not changed a second threshold distance within a threshold amount of time, or whether the respective local oscillator of the first sidelink-enabled device, the second sidelink-enabled device, or both, has been synchronized or initialized within a threshold amount of time before positioning of the selected positioning type is to take place: or any combination thereof.

Clause 12: A first sidelink-enabled device of sidelink positioning determination and communication, the first sidelink-enabled device comprising: a transceiver; a memory; and one or more processing units communicatively coupled with the transceiver and the memory, the one or more processing units configured to: obtain data from one or more data sources indicative of one or more criteria for using either Round-Trip Time (RTT)-based positioning of a target node or Single-Sided (SS)-based positioning of the target node: select a positioning type from the group consisting of RTT-based positioning and SS-based positioning, based on the data; and send a message via the transceiver to a second sidelink-enabled device, wherein the message includes information indicative of the selected positioning type.

Clause 13: The first sidelink-enabled device of clause 12, wherein the one or more processing units are configured to include, in the message, an Intelligent Transport System (ITS) message.

Clause 14: The first sidelink-enabled device of any of clauses 12-13, wherein the first sidelink-enabled device comprises a source node and the second sidelink-enabled device comprises the target node.

Clause 15: The first sidelink-enabled device of clause 14, wherein the one or more processing units are further configured to send a Position Reference Signal (PRS) via the transceiver, in accordance with the selected positioning type.

Clause 16: The first sidelink-enabled device of any of clauses 14-15, wherein to obtain the data from the one or more data sources the one or more processing units are configured to obtain information from the target node.

Clause 17: The first sidelink-enabled device of clause 16, wherein responsive to the information from the target node comprising an indication of a positioning type selection from the target node the one or more processing units are configured to select the position type further based on the positioning type selection from the target node.

Clause 18: The first sidelink-enabled device of any of clauses 12-13, wherein the first sidelink-enabled device comprises the target node and the second sidelink-enabled device comprises a source node.

Clause 19: The first sidelink-enabled device of any of clauses 12-18, wherein the one or more processing units are further configured to include, as the information indicative of the selected positioning type, two bits within the message.

Clause 20: The first sidelink-enabled device of any of clauses 12-19, wherein the one or more processing units are further configured to send the message using Media Access Control-Control Element (MAC-CE) or second stage control format.

Clause 21: The first sidelink-enabled device of any of clauses 12-20, wherein the message comprises a pre-PRS message.

Clause 22: The first sidelink-enabled device of any of clauses 12-21, wherein the one or more criteria comprise: whether relative positions over time between the first sidelink-enabled device and the second sidelink-enabled device fail to exhibit a threshold amount of angular changes: whether a respective speed sensor of the first sidelink-enabled device, the second sidelink-enabled device, or both, is determined to have a variance greater than a threshold value: whether the first sidelink-enabled device, the second sidelink-enabled device, or both, has moved a first threshold distance within a threshold amount of time: whether a relative distance between the first sidelink-enabled device and the second sidelink-enabled device has not changed a second threshold distance within a threshold amount of time, or whether the respective local oscillator of the first sidelink-enabled device, the second sidelink-enabled device, or both, has been synchronized or initialized within a threshold amount of time before positioning of the selected positioning type is to take place: or any combination thereof.

Clause 23: A device for sidelink positioning determination and communication, the device comprising: means for obtaining data from one or more data sources indicative of one or more criteria for using either Round-Trip Time (RTT)-based positioning of a target node or Single-Sided (SS)-based positioning of the target node: means for selecting a positioning type from the group consisting of RTT-based positioning and SS-based positioning, based on the data; and means for sending a message from the first sidelink-enabled device to a second sidelink-enabled device, wherein the message includes information indicative of the selected positioning type.

Clause 24: The device of clause 23, wherein the means for sending the message comprise means for sending an Intelligent Transport System (ITS) message.

29

Clause 25: The device of any of clauses 23-24, wherein the first sidelink-enabled device comprises a source node and the second sidelink-enabled device comprises the target node.

Clause 26: The device of clause 25, further comprising means for sending a Position Reference Signal (PRS) from the first sidelink-enabled device, in accordance with the selected positioning type.

Clause 27: The device of any of clauses 25-26, wherein the means for obtaining the data from the one or more data sources comprise means for obtaining information from the target node.

Clause 28: The device of any of clauses 23-24, wherein the first sidelink-enabled device comprises the target node and the second sidelink-enabled device comprises a source node.

Clause 29: The device of any of clauses 23-28, wherein the information indicative of the selected positioning type included in the message consists of two bits within the message.

Clause 30: A non-transitory computer-readable medium storing instructions for sidelink positioning determination and communication, the instructions comprising code for: obtaining data from one or more data sources indicative of one or more criteria for using either Round-Trip Time (RTT)-based positioning of a target node or Single-Sided (SS)-based positioning of the target node; selecting a positioning type from the group consisting of RTT-based positioning and SS-based positioning, based on the data; and sending a message from the first sidelink-enabled device to a second sidelink-enabled device, wherein the message includes information indicative of the selected positioning type.

What is claimed is:

1. A method of sidelink positioning determination and communication, the method comprising:
    obtaining, at a first sidelink-enabled device, data from one or more data sources indicative of one or more criteria for using either Round-Trip Time (RTT)-based positioning of a target node or Single-Sided (SS)-based positioning of the target node, wherein the one or more criteria comprise:
        whether relative positions over time between the first sidelink-enabled device and a second sidelink-enabled device fail to exhibit a threshold amount of angular changes;
        whether a respective speed sensor of the first sidelink-enabled device, the second sidelink-enabled device, or both, is determined to have a variance greater than a threshold value;
        whether the first sidelink-enabled device, second sidelink-enabled device, or both, has experienced a threshold amount of movement within a threshold amount of time;
        whether a relative distance between the first sidelink-enabled device and the second sidelink-enabled device has experienced less than a threshold amount of change within a threshold amount of time; or
        whether the respective local oscillator of the first sidelink-enabled device, second sidelink-enabled device, or both, has been synchronized or initialized within a threshold amount of time before positioning of the selected positioning type is to take place;
        or any combination thereof;

selecting, with the first sidelink-enabled device, a positioning type from the group consisting of RTT-based positioning and SS-based positioning, based on the one or more criteria; and
    sending a message from the first sidelink-enabled device to the second sidelink-enabled device, wherein the message includes information indicative of the selected positioning type.

2. The method of claim 1, wherein the message comprises an Intelligent Transport System (ITS) message.

3. The method of claim 1, wherein the first sidelink-enabled device comprises a source node and the second sidelink-enabled device comprises the target node.

4. The method of claim 3, further comprising sending a Position Reference Signal (PRS) from the first sidelink-enabled device, in accordance with the selected positioning type.

5. The method of claim 3, wherein obtaining the data from the one or more data sources comprises obtaining information from the target node.

6. The method of claim 5, wherein the information from the target node comprises an indication of a positioning type selection from the target node, and selecting the position type is further based on the positioning type selection from the target node.

7. The method of claim 1, wherein the first sidelink-enabled device comprises the target node and the second sidelink-enabled device comprises a source node.

8. The method of claim 1, wherein the information indicative of the selected positioning type included in the message consists of two bits within the message.

9. The method of claim 1, wherein the message is sent using Media Access Control-Control Element (MAC-CE) or second stage control format.

10. The method of claim 1, wherein the message comprises a pre-PRS message.

11. A first sidelink-enabled device for sidelink positioning determination and communication, the first sidelink-enabled device comprising:
    a transceiver;
    a memory; and
    one or more processing units communicatively coupled with the transceiver and the memory, the one or more processing units configured to:
        obtain data from one or more data sources indicative of one or more criteria for using either Round-Trip Time (RTT)-based positioning of a target node or Single-Sided (SS)-based positioning of the target node, wherein the one or more criteria comprise:
            whether relative positions over time between the first sidelink-enabled device and a second sidelink-enabled device fail to exhibit a threshold amount of angular changes;
            whether a respective speed sensor of the first sidelink-enabled device, the second sidelink-enabled device, or both, is determined to have a variance greater than a threshold value;
            whether the first sidelink-enabled device, second sidelink-enabled device, or both, has experienced a threshold amount of movement within a threshold amount of time;
            whether a relative distance between the first sidelink-enabled device and the second sidelink-enabled device has experienced less than a threshold amount of change within a threshold amount of time; or whether the respective local oscillator of the first sidelink-enabled device, second sidelink-enabled device, or both, has been synchronized or initialized within a threshold amount of time before positioning of the selected positioning type is to take place;

or any combination thereof;

select a positioning type from the group consisting of RTT-based positioning and SS-based positioning, based on the one or more criteria; and send a message via the transceiver to the second sidelink-enabled device, wherein the message includes information indicative of the selected positioning type.

12. The first sidelink-enabled device of claim 11, wherein the one or more processing units are configured to include, in the message, an Intelligent Transport System (ITS) message.

13. The first sidelink-enabled device of claim 11, wherein the first sidelink-enabled device comprises a source node and the second sidelink-enabled device comprises the target node.

14. The first sidelink-enabled device of claim 13, wherein the one or more processing units are further configured to send a Position Reference Signal (PRS) via the transceiver, in accordance with the selected positioning type.

15. The first sidelink-enabled device of claim 13, wherein, to obtain the data from the one or more data sources, the one or more processing units are configured to obtain information from the target node.

16. The first sidelink-enabled device of claim 15, wherein, responsive to the information from the target node comprising an indication of a positioning type selection from the target node, the one or more processing units are configured to select the position type further based on the positioning type selection from the target node.

17. The first sidelink-enabled device of claim 11, wherein the first sidelink-enabled device comprises the target node and the second sidelink-enabled device comprises a source node.

18. The first sidelink-enabled device of claim 11, wherein the one or more processing units are further configured to include, as the information indicative of the selected positioning type, two bits within the message.

19. The first sidelink-enabled device of claim 11, wherein the one or more processing units are further configured to send the message using Media Access Control-Control Element (MAC-CE) or second stage control format.

20. The first sidelink-enabled device of claim 11, wherein the message comprises a pre-PRS message.

21. A device for sidelink positioning determination and communication, the device comprising:

means for obtaining data from one or more data sources indicative of one or more criteria for using either Round-Trip Time (RTT)-based positioning of a target node or Single-Sided (SS)-based positioning of the target node, wherein the one or more criteria comprise:

whether relative positions over time between a first sidelink-enabled device and a second sidelink-enabled device fail to exhibit a threshold amount of angular changes;

whether a respective speed sensor of the first sidelink-enabled device, the second sidelink-enabled device, or both, is determined to have a variance greater than a threshold value;

whether the first sidelink-enabled device, second sidelink-enabled device, or both, has experienced a threshold amount of movement within a threshold amount of time;

whether a relative distance between the first sidelink-enabled device and the second sidelink-enabled device has experienced less than a threshold amount of change within a threshold amount of time; or whether the respective local oscillator of the first sidelink-enabled device, second sidelink-enabled device, or both, has been synchronized or initialized within a threshold amount of time before positioning of the selected positioning type is to take place;

or any combination thereof;

means for selecting a positioning type from the group consisting of RTT-based positioning and SS-based positioning, based on the one or more criteria; and means for sending a message from the first sidelink-enabled device to the second sidelink-enabled device, wherein the message includes information indicative of the selected positioning type.

22. The device of claim 21, wherein the means for sending the message comprise means for sending an Intelligent Transport System (ITS) message.

23. The device of claim 21, wherein the first sidelink-enabled device comprises a source node and the second sidelink-enabled device comprises the target node.

24. The device of claim 23, further comprising means for sending a Position Reference Signal (PRS) from the first sidelink-enabled device, in accordance with the selected positioning type.

25. The device of claim 23, wherein the means for obtaining the data from the one or more data sources comprise means for obtaining information from the target node.

26. The device of claim 21, wherein the first sidelink-enabled device comprises the target node and the second sidelink-enabled device comprises a source node.

27. The device of claim 21, wherein the information indicative of the selected positioning type included in the message consists of two bits within the message.

28. A non-transitory computer-readable medium storing instructions for sidelink positioning determination and communication, the instructions comprising code for:

obtaining data from one or more data sources indicative of one or more criteria for using either Round-Trip Time (RTT)-based positioning of a target node or Single-Sided (SS)-based positioning of the target node, wherein the one or more criteria comprise:

whether relative positions over time between a first sidelink-enabled device and a second sidelink-enabled device fail to exhibit a threshold amount of angular changes;

whether a respective speed sensor of the first sidelink-enabled device, the second sidelink-enabled device, or both, is determined to have a variance greater than a threshold value;

whether the first sidelink-enabled device, second sidelink-enabled device, or both, has experienced a threshold amount of movement within a threshold amount of time;

whether a relative distance between the first sidelink-enabled device and the second sidelink-enabled device has experienced less than a threshold amount of change within a threshold amount of time; or whether the respective local oscillator of the first sidelink-enabled device, second sidelink-enabled device, or both, has been synchronized or initialized within a threshold amount of time before positioning of the selected positioning type is to take place;
or any combination thereof;
selecting a positioning type from the group consisting of RTT-based positioning and SS-based positioning, based on the one or more criteria; and
sending a message from the first sidelink-enabled device to the second sidelink-enabled device, wherein the message includes information indicative of the selected positioning type.

* * * * *